US011246031B2

(12) United States Patent
McCutchen et al.

(10) Patent No.: US 11,246,031 B2
(45) Date of Patent: Feb. 8, 2022

(54) DISGUISING UE COMMUNICATIONS IN A CELLULAR NETWORK

(71) Applicant: Oceus Networks, LLC, Reston, VA (US)

(72) Inventors: Steven Michael McCutchen, Prosper, TX (US); Todd Alan Pressley, Gainesville, VA (US); John Thomas Green, Wylie, TX (US)

(73) Assignee: Oceus Networks, LLC, Reston, VA (US)

( * ) Notice: Subject to any disclaimer, the term of this patent is extended or adjusted under 35 U.S.C. 154(b) by 0 days.

(21) Appl. No.: 16/541,714

(22) Filed: Aug. 15, 2019

(65) Prior Publication Data

US 2020/0059785 A1 Feb. 20, 2020

Related U.S. Application Data

(60) Provisional application No. 62/764,679, filed on Aug. 15, 2018.

(51) Int. Cl.
*H04W 12/06* (2021.01)
*H04W 8/26* (2009.01)
(Continued)

(52) U.S. Cl.
CPC .......... *H04W 12/06* (2013.01); *H04W 8/18* (2013.01); *H04W 8/26* (2013.01); *H04W 12/43* (2021.01)

(58) Field of Classification Search
CPC ....... H04W 12/06; H04W 12/43; H04W 8/26; H04W 8/18
See application file for complete search history.

(56) References Cited

U.S. PATENT DOCUMENTS 5,309,503 A   5/1994   Bruckert et al.
5,768,501 A   6/1998   Lewis
(Continued)

FOREIGN PATENT DOCUMENTS

EP   1401229 A1   3/2004
EP   1553734 A1   7/2005
(Continued)

OTHER PUBLICATIONS

"Digital cellular telecommunications system (Phase 2+); Universal Mobile Telecommunications System (UMTS); LTE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.
(Continued)

*Primary Examiner* — Charles N Appiah
*Assistant Examiner* — Frank E Donado
(74) *Attorney, Agent, or Firm* — Knobbe, Martens, Olson & Bear, LLP

(57) ABSTRACT

A mobile device can select an identifier from a set of identifiers stored by the mobile device. The mobile device can communicate a request for a communication link with a communication system, and the request for the communication link can include the identifier. The communication link can be established based on the identifier. The mobile device can select a second identifier from the set of identifiers. The mobile device can communicate a second request for a second communication link with the communication system, and the second request can include the second identifier. The second communication link can be established based on the second identifier.

19 Claims, 6 Drawing Sheets

(51) Int. Cl.
  *H04W 8/18* (2009.01)
  *H04W 12/43* (2021.01)

(56) References Cited

U.S. PATENT DOCUMENTS

| | | |
|---|---|---|
| 6,842,462 B1 | 1/2005 | Ramjee et al. |
| 6,965,816 B2 | 11/2005 | Walker |
| 7,072,657 B2 | 7/2006 | Watanabe et al. |
| 7,317,717 B2 | 1/2008 | Pankajakshan et al. |
| 7,389,534 B1 | 6/2008 | He et al. |
| 7,486,967 B2 | 2/2009 | Pan et al. |
| 7,535,861 B2 | 5/2009 | Buchholz et al. |
| 7,539,158 B2 | 5/2009 | Pan |
| 7,548,763 B2 | 6/2009 | Pan |
| 7,567,822 B2 | 7/2009 | Hart et al. |
| 7,573,713 B2 | 8/2009 | Hoffman et al. |
| 7,653,414 B2 | 1/2010 | Pan |
| 7,684,801 B2 | 3/2010 | Suzuki et al. |
| 7,805,372 B2 | 9/2010 | Weiss |
| 7,817,589 B2 | 10/2010 | Hoffman et al. |
| 7,840,230 B2 | 11/2010 | Pan |
| 7,855,988 B2 | 12/2010 | Pan |
| 7,856,233 B2 | 12/2010 | Pan |
| 7,979,066 B2 | 7/2011 | Pan |
| 8,036,158 B2 | 10/2011 | Pan et al. |
| 8,046,420 B2 | 10/2011 | Pan |
| 8,089,920 B2 | 1/2012 | Pan |
| 8,107,409 B2 | 1/2012 | Pan |
| 8,140,077 B2 | 3/2012 | Saifullah et al. |
| 8,224,322 B2 | 7/2012 | Pan |
| 8,270,325 B2 | 9/2012 | Hoffman et al. |
| 8,310,990 B2 | 11/2012 | Pan |
| 8,326,286 B2 | 12/2012 | Pan |
| 8,340,667 B2 | 12/2012 | Pan |
| 8,359,029 B2 | 1/2013 | Pan |
| 8,374,124 B2 | 2/2013 | Abusch-Magder et al. |
| 8,503,336 B2 | 8/2013 | Rappaport et al. |
| 8,626,210 B2 | 1/2014 | Hicks, III |
| 8,654,749 B2 | 2/2014 | Buchholz et al. |
| 8,676,197 B2 | 3/2014 | Pan et al. |
| 8,688,111 B2 | 4/2014 | Pan |
| 8,706,105 B2 | 4/2014 | Pan |
| 8,744,435 B2 | 6/2014 | Pan |
| 8,780,804 B2 | 7/2014 | Pan |
| 8,811,992 B2 | 8/2014 | Hoole |
| 8,824,969 B2 | 9/2014 | Nakamori et al. |
| 9,055,163 B1 | 6/2015 | Row, II et al. |
| 9,167,442 B2 | 10/2015 | Uelk et al. |
| 9,198,221 B2 | 11/2015 | Schemagin et al. |
| 9,226,192 B2 | 12/2015 | Graffagnino et al. |
| 9,264,241 B2 | 2/2016 | Balar et al. |
| 9,338,093 B2 | 5/2016 | Eichen et al. |
| 9,444,801 B2 | 9/2016 | Luo et al. |
| 9,445,280 B2 | 9/2016 | Uelk et al. |
| 9,451,646 B2 | 9/2016 | Schemagin et al. |
| 9,686,238 B1 | 6/2017 | Row, II |
| 9,742,729 B2 | 8/2017 | Graffagnino et al. |
| 9,769,674 B2 | 9/2017 | Uelk et al. |
| 9,912,640 B2 | 3/2018 | Row, II |
| 9,924,427 B2 | 3/2018 | Graffagnino et al. |
| 10,021,619 B2 | 7/2018 | Schemagin et al. |
| 10,172,078 B2 | 1/2019 | Graffagnino et al. |
| 10,244,405 B2 | 3/2019 | Uelk et al. |
| 10,382,393 B2 | 8/2019 | Graffagnino et al. |
| 10,602,410 B2 | 3/2020 | Graffagnino et al. |
| 10,631,237 B2 | 4/2020 | Graffagnino et al. |
| 10,742,610 B2 | 8/2020 | Row, II et al. |
| 10,750,423 B2 | 8/2020 | Schemagin et al. |
| 10,757,579 B2 | 8/2020 | Uelk et al. |
| 10,873,891 B2 | 12/2020 | Hill et al. |
| 2001/0013107 A1 | 8/2001 | Lewis |
| 2004/0259554 A1 | 12/2004 | Rappaport et al. |
| 2004/0259555 A1 | 12/2004 | Rappaport et al. |
| 2006/0015745 A1 | 1/2006 | Sukigara et al. |
| 2006/0098661 A1 | 5/2006 | Pan |
| 2006/0178153 A1 | 8/2006 | Tenny et al. |
| 2006/0192651 A1 | 8/2006 | Lee |
| 2006/0234747 A1 | 10/2006 | Pan et al. |
| 2006/0234774 A1 | 10/2006 | Pan et al. |
| 2007/0049267 A1 | 3/2007 | Kota et al. |
| 2007/0202847 A1 | 8/2007 | Pan et al. |
| 2007/0232267 A1 | 10/2007 | Pan et al. |
| 2007/0253359 A1 | 11/2007 | Hall et al. |
| 2007/0264930 A1 | 11/2007 | Daoudal |
| 2007/0287452 A1 | 12/2007 | Pan et al. |
| 2008/0005380 A1 | 1/2008 | Kawasaki et al. |
| 2008/0039144 A1 | 2/2008 | Pan et al. |
| 2008/0095070 A1 | 4/2008 | Chan et al. |
| 2008/0108378 A1 | 5/2008 | Gessner et al. |
| 2008/0146158 A1 | 6/2008 | Pan et al. |
| 2008/0181188 A1 | 7/2008 | Aghvami et al. |
| 2008/0268830 A1 | 10/2008 | Sharma et al. |
| 2008/0285492 A1 | 11/2008 | Vesterinen |
| 2009/0117851 A1 | 5/2009 | Malaney |
| 2009/0156213 A1 | 6/2009 | Spinelli et al. |
| 2009/0201878 A1 | 8/2009 | Kotecha et al. |
| 2009/0205023 A1 | 8/2009 | Pan et al. |
| 2009/0227235 A1 | 9/2009 | Pan et al. |
| 2009/0232019 A1 | 9/2009 | Gupta et al. |
| 2009/0271491 A1 | 10/2009 | Pan et al. |
| 2009/0280853 A1 | 11/2009 | Brisebois et al. |
| 2009/0325584 A1 | 12/2009 | Pan et al. |
| 2009/0327819 A1 | 12/2009 | Pan et al. |
| 2010/0008306 A1 | 1/2010 | Pan et al. |
| 2010/0008369 A1 | 1/2010 | Pan |
| 2010/0027448 A1 | 2/2010 | Puthiyandyil et al. |
| 2010/0075668 A1 | 3/2010 | Pan et al. |
| 2010/0105373 A1 | 4/2010 | Kanade |
| 2010/0190470 A1 | 7/2010 | Raleigh |
| 2010/0197268 A1 | 8/2010 | Raleigh |
| 2010/0202455 A1 | 8/2010 | Sundaram et al. |
| 2010/0260098 A1 | 10/2010 | Ulupinar et al. |
| 2010/0260157 A1 | 10/2010 | Buchholz et al. |
| 2011/0059740 A1 | 3/2011 | Pan et al. |
| 2011/0060853 A1 | 3/2011 | Pan et al. |
| 2011/0069654 A1 | 3/2011 | Xu et al. |
| 2011/0122824 A1 | 5/2011 | Muhanna et al. |
| 2011/0130135 A1 | 6/2011 | Trigui |
| 2011/0176536 A1 | 7/2011 | De Franca Lima et al. |
| 2011/0190001 A1* | 8/2011 | Kodikara Patabandi ............ H04W 76/11 455/450 |
| 2011/0195743 A1 | 8/2011 | Jee et al. |
| 2011/0202589 A1 | 8/2011 | Piernot et al. |
| 2011/0223921 A1 | 9/2011 | Pan et al. |
| 2011/0263253 A1 | 10/2011 | Zhao et al. |
| 2011/0275364 A1 | 11/2011 | Austin et al. |
| 2011/0300866 A1 | 12/2011 | Ali et al. |
| 2012/0002537 A1 | 1/2012 | Bao et al. |
| 2012/0002607 A1 | 1/2012 | Pan et al. |
| 2012/0039245 A1 | 2/2012 | Wang et al. |
| 2012/0051321 A1 | 3/2012 | De et al. |
| 2012/0057568 A1 | 3/2012 | Lim et al. |
| 2012/0094659 A1 | 4/2012 | Pan et al. |
| 2012/0106454 A1 | 5/2012 | Pan et al. |
| 2012/0147874 A1 | 6/2012 | Kotecha |
| 2012/0155375 A1 | 6/2012 | Zhu |
| 2012/0224474 A1 | 9/2012 | Beser |
| 2012/0224566 A1 | 9/2012 | O'Leary |
| 2012/0252444 A1 | 10/2012 | Pan et al. |
| 2012/0269167 A1 | 10/2012 | Velev et al. |
| 2012/0276866 A1 | 11/2012 | Sennett et al. |
| 2012/0294226 A1 | 11/2012 | Racz et al. |
| 2013/0003697 A1 | 1/2013 | Adjakple et al. |
| 2013/0028097 A1 | 1/2013 | Barrett |
| 2013/0029708 A1 | 1/2013 | Fox et al. |
| 2013/0039279 A1 | 2/2013 | Pan et al. |
| 2013/0065583 A1 | 3/2013 | Pan et al. |
| 2013/0130677 A1 | 5/2013 | Pan et al. |
| 2013/0148578 A1 | 6/2013 | Pan et al. |
| 2014/0154967 A1 | 6/2014 | Pan et al. |
| 2014/0173388 A1 | 6/2014 | Pan et al. |
| 2014/0233412 A1 | 8/2014 | Mishra et al. |
| 2014/0315553 A1 | 10/2014 | Hoole |

(56) References Cited

U.S. PATENT DOCUMENTS

| | | | |
|---|---|---|---|
| 2015/0031361 A1* | 1/2015 | Timus | H04W 72/10 |
| | | | 455/436 |
| 2015/0181492 A1 | 6/2015 | Schmidt et al. | |
| 2015/0304282 A1 | 10/2015 | Xu | |
| 2015/0319774 A1 | 11/2015 | Cai et al. | |
| 2015/0358959 A1 | 12/2015 | Meshkati et al. | |
| 2016/0157281 A1* | 6/2016 | Syed | H04W 48/16 |
| | | | 370/329 |
| 2016/0316406 A1* | 10/2016 | Henry | H04W 12/08 |
| 2016/0345192 A1 | 11/2016 | Garg et al. | |
| 2016/0359738 A1 | 12/2016 | Sullenberger et al. | |
| 2016/0365882 A1 | 12/2016 | Kim et al. | |
| 2017/0026823 A1* | 1/2017 | Mohammed | H04W 8/04 |
| 2017/0111264 A1* | 4/2017 | Shankarappa | H04L 45/245 |
| 2017/0238229 A1 | 8/2017 | Schemagin et al. | |
| 2017/0279708 A1* | 9/2017 | Liu | H04W 12/0608 |
| 2018/0013724 A1 | 1/2018 | Row, II | |
| 2018/0014340 A1 | 1/2018 | Hill et al. | |
| 2018/0192264 A1 | 7/2018 | Kwok et al. | |
| 2018/0376325 A1* | 12/2018 | Xu | H04M 15/58 |
| 2018/0376398 A1 | 12/2018 | Schemagin et al. | |
| 2019/0053145 A1 | 2/2019 | Ieshiro et al. | |
| 2019/0150057 A1* | 5/2019 | Wang | H04W 40/10 |
| | | | 370/311 |
| 2019/0289471 A1 | 9/2019 | Uelk et al. | |
| 2019/0320356 A1* | 10/2019 | Shaw | H04W 36/08 |
| 2019/0320358 A1* | 10/2019 | Knapp | H04W 52/0209 |
| 2019/0394738 A1* | 12/2019 | Abedini | H04W 74/0833 |
| 2020/0036677 A1 | 1/2020 | Graffagnino et al. | |
| 2020/0037213 A1* | 1/2020 | Chen | H04W 36/0079 |
| 2020/0059785 A1 | 2/2020 | McCutchen et al. | |
| 2020/0267615 A1 | 8/2020 | Graffagnino et al. | |
| 2020/0336974 A1 | 10/2020 | Graffagnino et al. | |
| 2021/0084500 A1 | 3/2021 | Uelk et al. | |
| 2021/0084560 A1 | 3/2021 | Schemagin et al. | |
| 2021/0153093 A1 | 5/2021 | Hill et al. | |
| 2021/0176213 A1 | 6/2021 | Row, II | |

FOREIGN PATENT DOCUMENTS

| | | |
|---|---|---|
| EP | 2031920 A1 | 3/2009 |
| GB | 2452796 | 3/2009 |
| WO | WO 2007/044880 | 4/2007 |
| WO | WO 2009/100736 A1 | 8/2009 |
| WO | WO 2009/127965 A1 | 10/2009 |
| WO | WO 2014/031597 | 2/2014 |
| WO | WO 2014/031689 A1 | 2/2014 |
| WO | WO 2014/179235 | 11/2014 |

OTHER PUBLICATIONS

"Digital cellular telecommunications system (Phase 2+)(GSM); Universal Mobile Telecommunications System (UMTS); LTE; Non-Access-Stratum (NAS) functions related to Mobile Station (MS) in idle mode (3GPP TS 23.122 version 13.4.0 Release 13)", May 2016, 52 pages.

Kaul, et al.: "On the adpatation of commercial smartphones to tactical environments", Military Communications Conference, 2011, Nov. 7, 2011, pp. 2205-2210.

Nystromer, "Quiclink: A Portable 3G WCDMA Cellular Service, Deployed in Minutes" Presentation, Jun. 11, 2007, pp. 1-27.

Press Release: Harris Corporation Introduces Tactical 3G Cellular Network-in-a-Box for Warfighters, Published Apr. 19, 2011, http://harris.com/view_ pressrelease.asp?pr_id=3230.

Press Release: Tecore Unveils The Mobile Industry's First 3G-4G Network in A Box (NIB), Published Feb. 14, 2011, http://www.tecore.com/newsevents/release.cfm?newsID=164.

Tecore Networks, The Mobile Industry's First All-In-One Network Solution Supporting WCDMA, HSPA+ and L TE, first release Feb. 14, 2011, http://www.tecore.com/solutions/TecoreNetworks-Datasheet-2G-3G-4G-NetworkI nABox.pdf.

International Search Report and Written Opinion dated Feb. 11, 2014, International Application No. PCT/US2013/055864.

International Search Report and Written Opinion dated Nov. 8, 2013, International Application No. PCT/US2013/055721.

International Search Report and Written Opinion dated Sep. 26, 2014, International Application No. PCT/US2014/035732.

ETSI TS 136 331 v9.00 (Jan. 2009) (Year: 2009).

* cited by examiner

DISGUISING UE COMMUNICATIONS IN A CELLULAR NETWORK

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

A base station can broadcast signals or messages and one or more user equipment (UE) in a corresponding coverage area can receive and interpret the signals.

DETAILED DESCRIPTION

Figure 1:
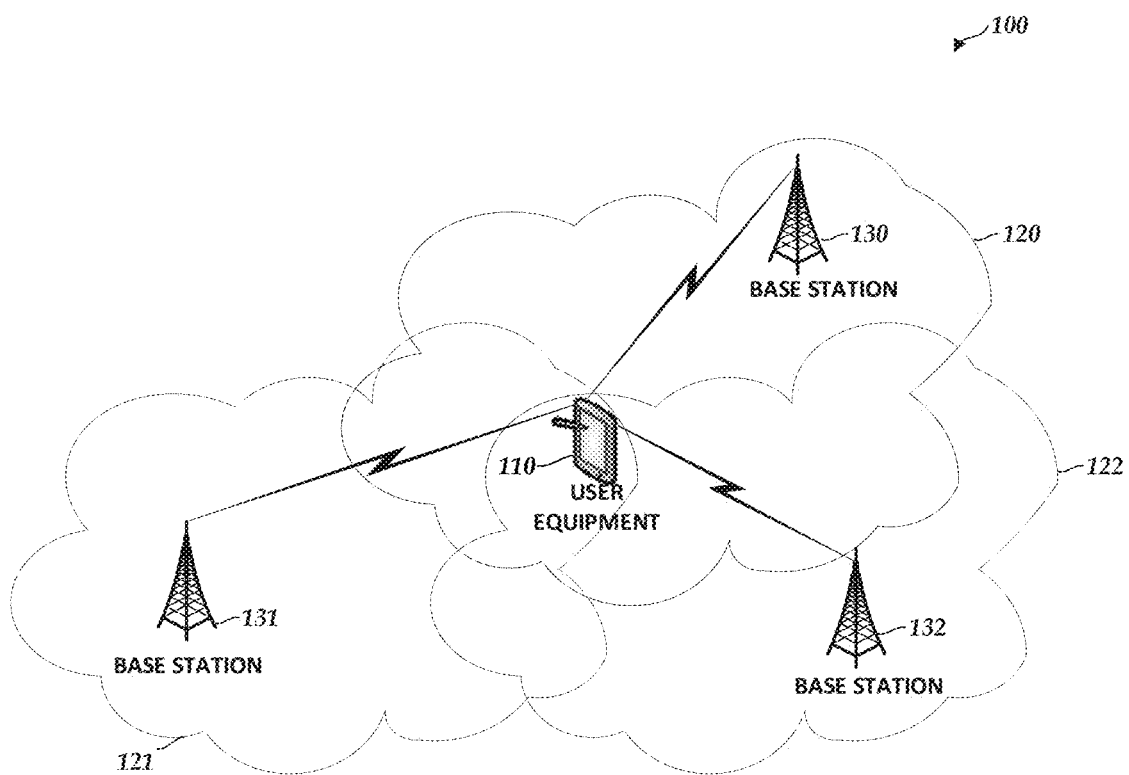
FIG. 1 is a diagram illustrative of an embodiment of an environment that shows a user device located within a cell or coverage area of a base station, as well as the coverage areas of other base stations.

In conventional mobile communication systems, a user equipment (UE) often includes a subscriber identity module (SIM) card that stores an identifier (non-limiting example: an international mobile subscriber identity or IMSI) to which the UE is linked. In general, the identifier can be used to uniquely identify the UE, authenticate the UE for a network, verify that the UE is subscribed to a network, etc. For example, during certain communications with a base station, the UE could provide the identifier to gain access to a network. Traditionally, the identifier is hard-coded into the SIM card and, as a consequence, changing the identifier generally requires physically replacing the SIM card.

It can be desirable for a UE to prevent others (for example, eavesdropping devices) from intercepting the identifier during the UE's communications. For example, if captured, the identifier can be used maliciously, such as to track, discover, or imitate the UE. This can be especially detrimental in those environments where anonymity is important to safety, such as in military conflict zones.

Some efforts to prevent eavesdroppers from intercepting the identifier rest on the idea of communicating the identifier as rarely as possible. For example, in some cases, after the UE communicates the identifier to a base station (for example, in an attach request), a temporary identifier (non-limiting examples: Temporary Mobile Subscriber Identity or TMSI, Globally Unique Temporary Identifier or GUTI, etc.) is generated and assigned to the UE. The temporary identifier can often be used in place of the identifier, and, as a result, use of the temporary identifier can reduce the exposure of the identifier, making the identifier less likely to be intercepted during communications. However, in general, to be assigned a temporary identifier, the UE must first communicate the identifier, which leaves the identifier vulnerable to interception.

In some cases, to reduce some negative consequences of the identifier being intercepted, the UE can be allocated or assigned multiple identifiers, any one of which can be included in an attach request by the UE and/or used to authenticate the UE. In this way, the UE can "hide" by changing or cycling through identifiers. For example, the UE can utilize a different identifier for each new attach request. In this way, even if an identifier is intercepted, it is likely that the UE has discontinued use (or will soon discontinue use) of that identifier in favor of another identifier. As a result, it is unlikely that the intercepted identifier could be used to track further communications by the UE, at least because the UE is utilizing a different identifier. Furthermore, in some cases, it may be advantageous for the UE to actively detach from a network and then subsequently re-attach to the same network using a different identifier. For example, this can be done periodically, such as based at least in part on a time- or communication-based schedule.

To reduce the likelihood that an eavesdropping device can intercept the identifier and/or recognize the identifier if intercepted, in some cases, the UE can communicate one or more diversion communications. For example, in some cases, a UE can be utilized as a diversion or tactical device that is configured to communicate multiple diversion messages (e.g., RACH requests, attach requests, etc.) to a communication system. In this way, the UE may appear, from the perspective of an eavesdropping device, as multiple UE. Thus, the UE can give the impression of many UE (rather than the single UE that it is) and may confuse or overwhelm an eavesdropper. In some cases, the diversion messages can be communicated in succession (e.g., one after another) and/or in parallel (e.g., two or more at concurrent times).

Communications Overview

Base stations can routinely broadcast information in the form of broadcast signals or messages (non-limiting example: synchronization signals, master information blocks or MIBs, system information blocks or SIBs, etc.) over one or more frequency bands within a coverage area. The information can be broadcast multiple times a second (non-limiting example: every 40 ms) and can include bandwidth information for the base station at a particular frequency band, signal decoding information, such as a Physical HARQ Indicator Channel (PHICH), that can be used to decode future signals and symbols, and system frame timing, etc.

Additional signals broadcast by the base station can provide the UE with relevant information regarding the base station and the cell, or coverage area, where the UE is located. For example, the additional signals can provide synchronization information (for example, a Primary Synchronization Signal (PSS), a Secondary Synchronization Signal (SSS), etc.), access credentials, a schedule for other following signals, mobile network code (MNC), mobile country code (MCC), multi-band carrier code (MBC), type allocation code (TAC) for the cell, radio resource control (RRC), uplink power control, preamble power ramping, uplink cyclic prefix length, sub frame hopping, uplink Evolved Absolute Radio Frequency Channel Number (EARFCN) center frequency, cell re-selection information, exclusivity parameter, cell barred timer, access class barred, cell ID, intra-frequency neighbors, basic handover information; etc. In some embodiments, the additional signals can be signal information blocks (SIBs).

The UE in the coverage area, or cell, of the base station receive the signals or messages broadcast by the base station. For example, UE can be configured to scan one or more frequency bands for signals broadcast from any base station. Using the various signals, the UE can determine the strength and quality of the base station signal where the UE is located. The UE in the coverage area can use the signal quality and strength, as well as other information (non-limiting examples: service type, PLMN acceptability, etc.), to determine whether the UE should attempt to establish a communication link with the base station. Furthermore, using the various signals, the UE can acquire time, frequency, and/or phase synchronization with the base station.

In some cases, based at least in part on the broadcast signals, the UE can request a secondary communication link with the base station broadcasting the signals. In some cases, the secondary communication link enables the UE to establish bi-directional communication with the base station, but does not enable the UE to communicate with other UE accessible via a network associated with the base station. For example, in some cases, the secondary communication link corresponds to a low-level radio frequency (RF) connection. In some cases, the secondary communication link is established based at least in part on a Random Access Procedure performed by the UE and/or the base station. For example, in some cases, the request for the secondary communication link includes a Random Access Preamble (PRACH). As another example, in some cases, the request for the secondary communication link includes a Radio Resource Control (RRC) request. For instance, the secondary communication link can correspond to a Radio Resource Control (RRC) connection.

In some cases, based at least in part on the broadcast signals, the UE can request a primary communication link with the base station. In some cases, the primary communication link enables the UE to connect to the network associated with the base station and communicate with other devices that are accessible via the network, such as other UE, servers, etc. For example, in some cases, the primary communication link corresponds to a cellular connection. In some cases, the request for the primary communication link with the base station can correspond to be referred to as an attach request. The request for the primary communication link can include an identifier (for example, an International Mobile Subscriber Identity or IMSI) that can be used to authenticate the UE for the network (for example, verify that the UE is subscribed to the network.

In some cases, the UE can communicate the request to establish a primary communication link only after the secondary communication link is established with the base station. However, in some cases, the UE can communicate the request to establish a primary communication link without a secondary communication link having been established. In some cases, as part of establishing the primary communication link, the network core (for example, a home subscriber server or HSS, a mobility management entity or MME, etc.) can authenticate and/or authorize the UE for the network.

In some cases, after a communication link (for example, one or both of a second communication link or a primary communication link) is established between the UE and a base station, the communication link can be intentionally terminated. For example, in some cases, the UE can terminate the communication link or cause it to be terminated based at least in part on a connection policy. For example, according to the connection policy, the UE can terminate a communication link in order to establish a new communication link using a different identifier. Similarly, in some cases, the base station can intentionally terminate the communicate link or cause it to be terminated based at least in part on the connection policy. In some cases, a communication link is unintentionally terminated, for example due to loss of a radio or cellular signal.

Environment Overview

FIG. 1 is a block diagram illustrative of an embodiment of an environment 100 that shows a user device 110 located within a cell or coverage area 120 of a base station 130, as well as the coverage areas 121, 122 of other base stations 131, 132, respectively. Although only one UE 110 is shown in FIG. 1, it will be understood that multiple UE 110 can be located within the coverage areas 120, 121, 122.

The base stations 130, 131, 132 can include an antenna to communicate wirelessly with the user device 110, one or more data stores, and one or more processors to process the signals received by and sent to the UE 110. In some embodiments, the base stations 130, 131, 132 are implemented as eNodeBs that are in wired communication with one or more components of a network core. The components of the network core may be remotely located from the base stations 130, 131, 132, or co-located to form a communication system, such as those described in greater detail in U.S. Pub. No. 2014/0323137 (the '137 Application), entitled "Mobile Cellular Network Backhaul," filed Apr. 29, 2014, which is hereby incorporated herein by reference in its entirety.

In certain embodiments, the base stations 130, 131, 132 are implemented as mobile cellular network (MCN) communication systems, which are described in greater detail in the '137 Application and/or a communication system, such as communication system 200, described herein. One example of a commercially available MCN communication system is the Xiphos® available from Oceus Networks. In such embodiments, the base station 130 can independently provide communication links between devices located within the coverage area 120, or communicate with the base stations 131, 132 to provide communication links between devices in different coverage areas 120, 121, 122. For example, each base station 130, 131, 132 can independently provide communication links between two UE 110 located within a respective coverage area 120, 121, 122. As another example, the base station 131 can independently provide a communication link between a UE in coverage area 121 and a server or service that is co-located with the base station 131, or may provide a communication link to another service or servicer that is not co-located with the base station 131. In some embodiments, a server or service can be co-located with a base station 130, 131, 132, such as physically coupled to the base station 130, 131, 132, located in the same room, tent, or building with the base stations 130, 131, 132. In certain embodiments, the server or service is remotely located from the base stations 130, 131, 132. Furthermore, the MCN communication systems can be mobile during operation, thereby providing a cellular network that is mobile or can be moved. Accordingly, although reference is made in the various drawings to communicating with initiating a connection to, or connecting to a base station, it will be understood that the UEs can communicate with, request a connection to, or connect to one or more communications systems that provide a cellular network that is mobile during operation.

In certain embodiments, the UE 110 can include a processor, one or more data stores, and a communication interface, such as a transceiver that includes an antenna, for wireless communication with the base stations 130, 131, 132, etc. In some embodiments, the UE 110 can include, but is not limited to a cellular phone, tablet, laptop, or other device that is configured to establish wireless communications with the base stations 130, 131, 132. Additional description and examples of the UE 110 can be found in the '137 Application, incorporated herein by reference.

Communication System Overview

A cellular network typically includes multiple stationary antennas, base stations, or the like, in different locations that communicate with a mobile telephone switching office (MTSO) and/or one or more core network components (generally referred to as the core or core network) that are remotely located from the different base stations. The MTSO or mobile core determines how calls are routed between the base stations and enables the base stations to communicate with each other for handover purposes. If a base station cannot communicate (non-limiting example: via a backhaul) with the MTSO or mobile core, or the rest of the network, all communications at that base station are lost and UE in corresponding network areas cannot communicate with other UE, even if the UE trying to communicate with each other are in the same network area. In addition, the base stations are built to be stationary so that UE within a particular geographic area always have network access.

When a user moves from one network to another network, the mobile cores of the two networks communicate with each other to handle the handover and other configuration details (non-limiting example: a core network component of the first cellular network communicates with a core network component of the second cellular network). In addition to communicating for handover purposes, core network components from different cellular networks may also communicate in order to route data (non-limiting examples: voice data, video data, application data, control data, etc.) from a user in a first cellular network to another user in a second cellular network.

Figure 2:
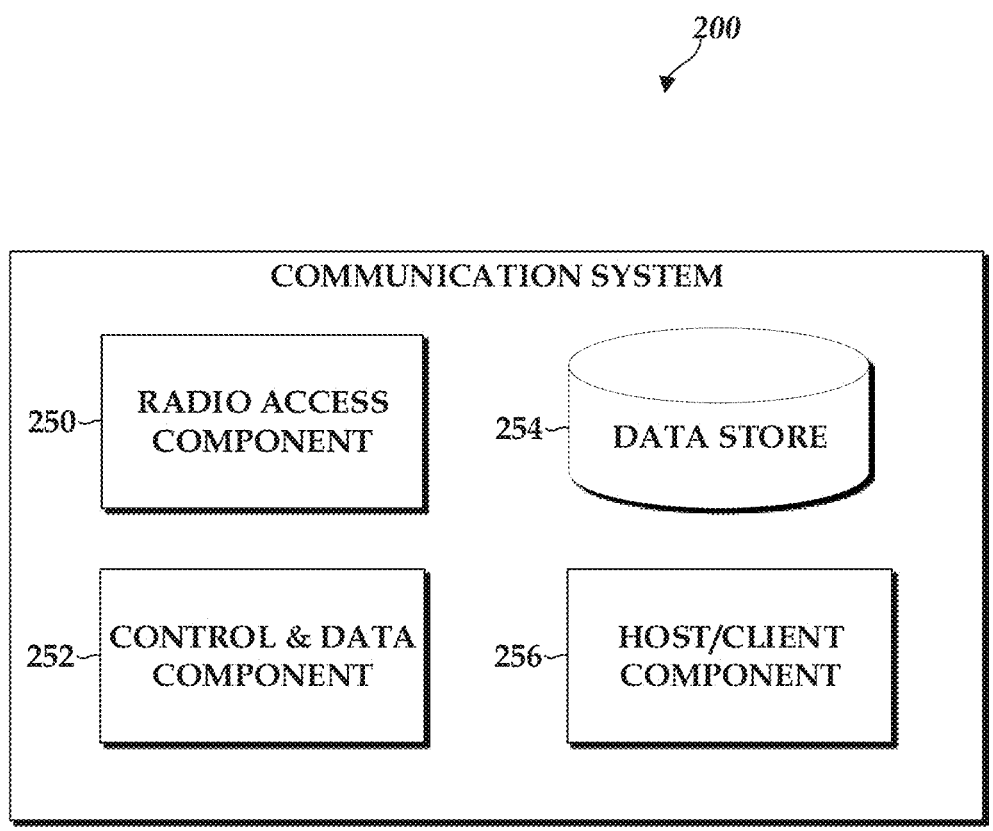
FIG. 2 is a block diagram of an embodiment of a communication system.

FIG. 2 is a block diagram of an embodiment of a communication system 200 that can independently provide a cellular network that is mobile. In certain embodiments, the communication system 200 can also be referred to as an MCN communication system. In the illustrated embodiment, the communication system 200 includes a radio access component 250, which can be used to send/receive wireless communication to/from the communication system 200, a control and data component 252, and a data store 254. The communication system 200 can include fewer, more, or different components as desired and as described in greater detail in U.S. Pub. No. 2014/0057636 (the '636 Application), entitled Mobile Cellular Networks, and the '137 Application, each of which is incorporated by reference herein in its entirety. For example, the communication system 200 can include and/or can communicate with an antenna, satellite dish, and the like, to receive data from UE or other endpoints, other communication systems, satellites, and the like. In certain embodiments, the communication system 200 can communicate with multiple eNodeBs, base stations, or the like, to increase its coverage area. In addition, in an IP network architecture, the received/transmitted data can all be in the form of IP data packets.

One or more communication systems 200 can be deployed in areas where cellular networks are not available and each communication system can independently provide a self-contained cellular network that is portable during operation for devices in respective coverage areas. In some cases, multiple communication systems can be networked together to create a network of communication systems, also referred to herein as a NOM, as described in greater detail in the '636 Application and the '137 Application, each of which is incorporated herein by reference. The different communication systems within the NOM or between NOMs, can communicate with each other via a backhaul using a variety of communication technologies, including satellite communication, microwave or radio wave communication, OFDM, WiMAX, LTE, etc., as described in greater detail in the '636 Application and the '137 Application, each of which is incorporated herein by reference, and, in some cases, NOMs can communicate with each other. As further described in the '636 Application and the '137 Application, each of which is incorporated herein by reference, when networked together, some communication systems 200 can be configured as master devices or hosts and other communication systems 200 can be configured as secondary devices, clients and/or relays.

In some embodiments, each of the components of the communication system 200 can include an identifier, such as an IP address, MAC address, etc. Furthermore, in certain embodiments, the network (in some embodiments a MCN) provided by the communication system 200 can include one or more network identifiers, such as access point names, etc. In some embodiments, different types of data can be associated with different access point names. For example, voice-over-IP (VOIP) data can be associated with one access point of the communication system, Internet data can be associated with a different access point of the communication system, etc. Similarly, video data, video data, audio data, file transfer data, text or short message service (SMS) data, multimedia or multimedia message service (MMS) data, etc., can each be assigned to a different APN, or grouped together in any combination on the same APN, as desired. In some cases, the use of different APNs can be based at least in part on network policy, such as, but not limited to, treatment of different types of packets or data, treatment of different users. In certain cases, the use of different APNs can be based at least in part on billing systems (e.g., the ability to charge for different types of data), carrier grade redundancy (e.g., making data paths for some type of data more resilient than others, such as to make voice data more reliable than Internet data). Furthermore, in some cases, some types of data can be blocked, such as during authentication, depending on the network deployment. Signals sent over the network can use the network identifiers of the communication system 200 to identify the communication system 200 that is to process the packet and/or that can access a particular destination, etc.

In some embodiments, the communication system 200 can function in an independent mode where communication with other communication systems or a backhaul communication is limited or non-existent. In such embodiments, upon receiving a packet of data, the first communication system 200 can refer to a look-up table stored in a data storage device to determine whether a destination identifier of the packet is within its coverage area. If the destination is within the coverage area (non-limiting examples: an endpoint within the coverage area, a component of the communication system 200, etc.), the communication system 200 can transmit the data to the destination. The data can include any one or more types of communications, including, but not limited to, user plane data (non-limiting examples: voice data, video data, e-mail, SMS data, picture data, files, requests for information, etc.) or control plane data. If the first communication system 200 determines that the destination is not within its coverage area, the first communication system 200 can transmit a message to the source that communication with the destination is not available, etc.

The communication system 200 can also function in a networked mode such that communication with a destination is available even if the destination is not located within the communication system's coverage area. In some instances, the destination may be accessible via the Internet (non-limiting examples: via satellite or wired communication), microwave communication, LTE backhaul, or other form of backhaul technology, etc.

In some embodiments, multiple communication systems 200 can be related together. In addition, in certain embodiments, when in the networked mode multiple communication systems 200 can be associated together and/or networked together as described in greater detail in the '636 Application and the '137 Application, incorporated herein by reference.

Furthermore, when related together, the communication systems 200 can have different functionality depending on their relationship with the other communication systems 200. For example, as described in greater detail in the '636 Application and the '137 Application, incorporated herein by reference, when related together, one of the communication systems 200 can be designated as a host communication system or Master Device, while the remaining communication systems can be designated as client communication systems, relay communication systems, and/or Secondary Devices.

Furthermore, when multiple communication systems 200 are networked together, a UE can move from the coverage area of a first communication system 200 to the coverage area of a second communication system 200 without disrupting the service of the UE. As the UE moves from the coverage area of the first communication system 200 to the coverage area of the second communication system 200, the first and second communication systems 200 can effectuate a handover that updates which communication system 200 provides the UE with network access. For example, as part of the handover routine the UE can establish a first cellular communication link with the first communication system 200 and terminate a second cellular communication link with the second communication system 200. Any communication systems 200 to which the UE is registered (non-limiting example: a registered communication system) can similarly update its routing table and any session identifiers in order to continue providing a communication pathway or link for the UE.

With continued reference to FIG. 2, the control and data component 252 can be implemented using one or more computer processors, FPGAs, microcontrollers, etc., and can perform the various operations of the communication system 200. In an IP network architecture, such as 4G LTE, the control and data component 252 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-communication system handovers. For idle state UE, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the communication system 200 and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the communication system 200.

Similarly, the control and data component 252 can perform the attachment and detachment of UE, authentication procedures, gateway selection, managing PDN connections, UE tracking and paging, etc. The control and data component 252 can also handle the user data between the radio access component and an external IP network, packet routing and forwarding, handover functions between communication systems 200, packet buffering initiation of network triggered service request procedures, quality of service policy enforcement, static policy, subscriber location management, subscriber data, and the like. In addition, the control and data component 252 can perform additional procedures as described in greater detail in the '636 Application and the '137 Application, incorporated herein by reference.

The data store 254 can include data regarding the UE in communication with the communication system 200 and within the coverage area corresponding to the communication system 200, such as UE location, authentication keys, etc. In some embodiments, such as in an IP network architecture such as a 4G LTE network, the data store 254 can include a home subscriber server (HSS). In addition, the data store 254 can include information regarding other communication systems 200 that are registered with the communication system 200.

The HSS can include subscription information for all UE (including client communications systems that are registered as UE) associated with the communication system 200, such as all the UE located within the coverage area of a communication system 200 and/or the UE located within the coverage area of related or associated communication systems 200. The HSS can store, for example, authentication parameters, security keys, and subscription information for UE within the communication system 200 or associated with the communication system 200. Furthermore, the HSS can include subscriber location information and be involved with subscriber data handling, authentication procedures, etc.

Similarly, the data store 254 can further include data identifying other related communication systems 200. In some cases, the data identifying the other related communication systems 200 can be used to communicate with the other communication systems 200.

Example Communications Between a UE and a Communication System

Figure 3:
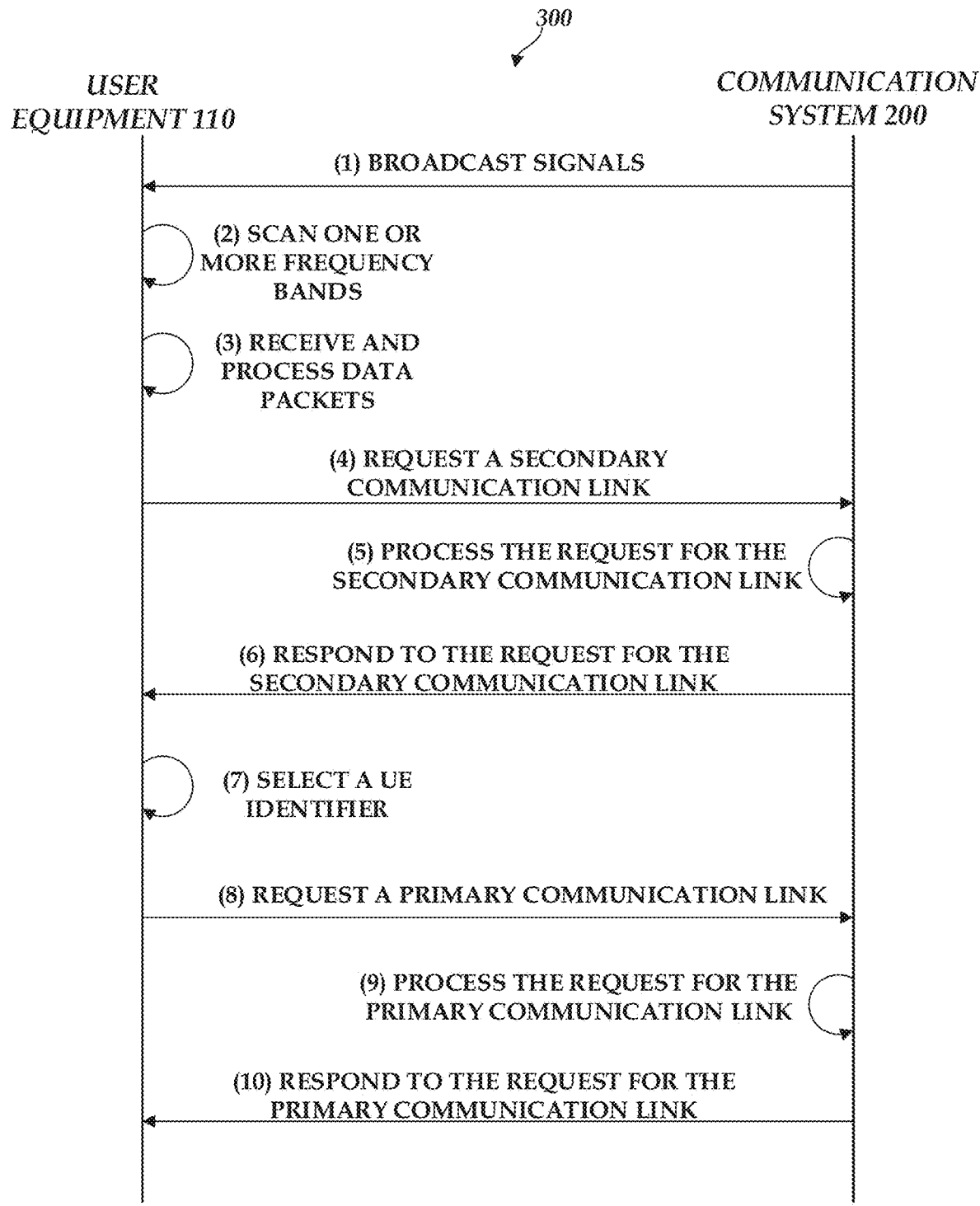
FIG. 3 illustrates a sequence diagram for example communications between a UE and a base station.

FIG. 3 illustrates a sequence diagram for example communications between a UE 110 and a communication system 200. Although only one UE 110 and communication system 200 are shown in FIG. 3, it will be understood that the environment 200 can include fewer or more components as desired and/or be configured differently. For example, as described herein, in some cases, the communication system 200 can include or be in communication with one or more base stations 130, 131, 132, an MME, an SGW, an HSS, a PGW, or the like. In some such cases, one or more of the communications or steps of FIG. 3 can occur between or be performed by any of the base stations 130, 131, 132, MME, SGW, HSS, or PGW. Furthermore, the sequence in FIG. 3 can occur between the communication system 200 and multiple UE 110 and/or between a UE 110 and multiple communication systems 200. Furthermore, additional, fewer, or different communications can occur between UE 110 and the communication system 200, and/or additional components can be used to communicate the data between UE 110 and the communication system 200.

At (1), the communication system 200 broadcasts information in the form of broadcast signals over one or more frequency bands within a coverage area of a network associated with the communication system 200. In some cases, the communication system 200 can broadcast the signals to multiple UE 110 located within a coverage area. In certain embodiments, all UE within a coverage area receive the broadcast signals from the communication system 200. In some embodiments, the broadcast signals are not directed to any particular UE 110, but are for any UE 110 that receives them.

The broadcast signals can be broadcast multiple times a second, such as every 40 ms. The broadcast signals can include various information including, but not limited to, synchronization data with the communication system 200 that a UE can use to synchronize with the communication system 200, bandwidth information for the communication system 200 at a particular frequency band, signal decoding information to decode future signals and symbols, system frame timing, etc. In addition or alternatively, the information can include, but is not limited to, information regarding the communication system 200 or the coverage area of the communication system 200. For example, the broadcast signals can provide access credentials, a schedule for other following signals, MNC, MCC, MBC, TAC, RRC, uplink power control, preamble power ramping, uplink cyclic prefix length, sub frame hopping, uplink EARFCN center frequency, cell re-selection information, exclusivity parameters, cell barred timer, access class barred, cell ID, intra-frequency neighbors, basic handover information, or the like.

At (2), the UE 110 scans one or more frequency bands for broadcast signals. For example, the UE 110 can scan or monitor one or more frequency bands to "listen" for broadcast signals. In some cases, the UE 110 determines to scan the one or more frequency bands based at least in part on a connection policy. Furthermore, in some cases, as described in more detail below, the UE 110 may terminate a communication link (for example, a primary communication link and/or a secondary communication link) prior to (or concurrently with) scanning the frequency band(s). For example, in some cases, the UE 110 is attached to a network and will detach from that network (or terminate a communication link associated with that network) prior to (or concurrently with) scanning the frequency band(s). In some cases, the UE 110 may terminate a communication link based at least in part on the connection policy. In this way, in some cases, the connection policy can trigger the UE 110 to terminate a communication link and/or scan the frequency band(s).

In some cases, the connection policy can indicate a time-based schedule. In some such cases, the connection policy can indicate to terminate an existing communication link and/or scan the frequency band(s) every X number of seconds, or every X minute(s), and so forth. For example, the UE 110 can terminate an existing communication link based at least in part on a determination that a scan has not occurred in X number of seconds, X number of minutes, etc. As another example, the UE 110 can scan one or more frequency bands based at least in part on a determination that a scan has not occurred in X number of seconds, X number of minutes, etc. Similarly, in some cases, the connection policy can indicate to terminate an existing communication link and/or scan the frequency band(s) based at least in part on a determination that a communication link has been established for a predetermined period of time.

In some cases, the connection policy can indicate a communication-based schedule. In some such cases, the connection policy can indicate to terminate an existing communication link and/or scan the frequency band(s) every X number of communications (e.g., messages, packets, signals, phone calls, emails, etc.) sent by the UE 110, received by the UE 110, and/or communication between the UE 110 and a communication system 200. For example, the UE 110 can terminate an existing communication link and/or scan the frequency band(s) based at least in part on a determination that a number of communications have occurred over the communication link. In certain cases, the connection policy can indicate to terminate an existing communication link and/or scan the frequency band(s) based at least in part on a determination that a message has been sent, or a UE, server or service is no longer being communicated with, etc. For example, the connection policy may indicate that an existing communication link is to be terminated after a phone call is completed, after a SMS message or email message is sent, or after an application executing on the UE that accesses a remote service is closed, etc.

In certain embodiments, the connection policy can indicate that the UE 110 is to terminate an existing communication link and/or scan the frequency band(s) based at least in part on a connectivity threshold. In some such cases, the connection policy can indicate that the UE 110 is to terminate an existing communication link and/or scan the frequency band(s) based at least in part on a determination that a communication link with a communication system (such as, but not limited to, communication system 200) does not satisfy the connectivity threshold. For example, based at least in part on the quality of the communication link, signal strength, the number of communication errors, etc., the communication link may not satisfy the connectivity threshold.

In some cases, the UE 110 may be attempting to attach to a network of the communication system 200 for the first time, such that no communication link between the UE 110 and the communication system 200 has yet been established. In some cases, a previous communication link with the communication system 200 may have been broken or terminated. For example, the communication system 200 may have detached the UE 110 from the network (for example, because of poor communication link quality, maintenance purposes, re-authorization failure, lack of resources, etc.) As another example, the UE 110 may have detached itself from the network (for example, by turning off an antenna, removing a SIM card, etc.)

In some cases, the connection policy can indicate that the connectivity threshold is not satisfied if a communication link with the communication system 200 is limited or weak. For instance, the UE 110 can monitor various connectivity parameters related to the communication link, such as, but not limited to, bandwidth, the number of dropped packets or error rates, bit rate, throughput, transmission delay, speed, latency, jitter, quality of service, availability, etc. In some cases, the UE 110 can determine that the communication link does not satisfy the connectivity threshold if any one or any combination of the bandwidth does not satisfy a bandwidth threshold, the speed of the communication link does not satisfy a speed threshold, error rate of the communication link does not satisfy an error rate threshold, the number of packets dropped does not satisfy a packets dropped threshold, bit rate of the communication link does not satisfy a bit rate threshold, throughput of the communication link does not satisfy a throughput threshold, transmission delay of the communication link does not satisfy a transmission delay threshold, quality of service of the communication link does not satisfy a quality of service threshold, availability of the communication link does not satisfy an availability threshold, latency of the communication link does not satisfy a latency threshold, jitter in the communication link does not satisfy a jitter threshold, the quality of the communication link does not satisfy a quality of link threshold, etc.

In certain embodiments, the connection policy can indicate location-based rules. For example, the connection policy can indicate to terminate an existing communication link and/or scan the frequency band(s) based at least in part on a location of the UE 110 (for example, global positioning system (GPS) location, location relative to a communication system or coverage area, etc.) or a communication system 200. For example, in some cases, the connection policy can indicate location-based rules. For example, the connection policy can indicate to terminate an existing communication link and/or scan the frequency band(s) based at least in part on a determination that the location of the UE 110 does not satisfy a location threshold associated with a coverage area of the network (for example, the UE 110 is not within the coverage area).

In certain embodiments, the connection policy can indicate to terminate an existing communication link and/or scan the frequency band(s) based at least in part on a power status of the UE 110 satisfying, or not satisfying, a power status threshold. For example, the power status may fail to satisfy the power status threshold when the UE 110 is powered off, powered on, is in idle mode, etc.

In certain embodiments, the connection policy can indicate to terminate an existing communication link and/or scan the frequency band(s) based at least in part on a number of communications over a communication link. In some cases, the connection policy can indicate to terminate an existing communication link and/or scan the frequency band(s) based at least in part on a determination that a number of communications over the first primary communication link satisfies a communications threshold. For example, connection policy can indicate to terminate an existing communication link and/or scan the frequency band(s) based at least in part on a determination that five phone calls have been made and/or 50 email messages have been sent/received, etc. Thus any one type or different types of communications can be used to determine whether the communications threshold has been satisfied or to determine that an existing communication link is to be terminated.

In some cases, the connection policy may indicate that the UE 110 is to terminate an existing communication link and/or scan the frequency band(s) based at least in part on a combination of any of the aforementioned connection policies. For example, the connection policy may indicate a time-based schedule in combination with a connectivity threshold. For example, the UE 110 can determine to terminate an existing communication link and/or scan the frequency band(s) based at least in part on a determination that a communication link between the UE 110 and a communication system does not satisfy the connectivity threshold or a determination that UE 110 has not scanned one or more frequency bands in X number of seconds, X number of minutes, etc. As another example, the connection policy may indicate that the UE 110 is to scan the one or more frequency bands based at least in part on a determination that UE 110 has not scanned one or more frequency bands in X number of seconds, X number of minutes, etc. since a determination that a communication link between the UE 110 and a communication system does not satisfy the connectivity threshold.

In some cases, the connection policy may indicate that the UE 110 is to scan the one or more frequency bands based at least in part on a determination that the UE 110 is detached from a base station, in response to the UE 110 detaching from a base station, or a determination that the UE 110 has been detached from a base station for X number of seconds, X number of minutes, etc. For example, in some cases, the connection policy indicates that the UE 110 is to detach from a base station and further indicates that the UE 110 is to scan one or more frequency bands after detaching.

Any one or any combination of the aforementioned functions can be used as part of a connection policy. In some cases, different UE 110 can use different connection policies, or a single UE 110 can use different connection policies. For example, a UE 110 can use a first connection policy for a first network or communication system 200 and can use a second connection policy for a second network or communication system 200. Accordingly, it will be understood that UEs can concurrently use/apply different connection policies to terminate an existing communication link and/or scan the frequency band(s).

At (3), the UE 110 receives one or more broadcast signals and processes the received signals. In certain embodiments, the UE 110 processes broadcast signals from multiple base stations 130, 131, 132. In some cases, as part of the processing, the UE 110 can synchronize with a communication system 200. For example, using at least some of the received signals, the UE 110 can acquire time, frequency, and/or phase synchronization with the communication system 200. In some cases, as part of the processing, the UE 110 can determine a strength and/or quality of a signal received from the communication system 200, determine an identity of the communication system 200, or decode a signal received from the communication system 200. For example, in some cases, processing the received signals includes decoding at least one of a primary synchronization signal (PSS), a secondary synchronization signal (SSS), a Master Information Blocks (MIB), or a System Information Block (SIB). In some cases, processing the received signals enables downlink access from the communication system 200 to the UE 110. In some cases, processing the received signals enables uplink access from the UE 110 to the communication system 200. In some cases, processing the received signals enables both downlink access and uplink access.

At (4), the UE 110 communicates a request for a secondary communication link with the communication system 200. In some cases, the UE 110 communicates the request for a secondary communication based at least in part on one or more of the broadcast signals. For example, in some cases, the UE 110 communicates the request for the secondary communication link based at least in part on a determination that the broadcast signals from the communication system 200 satisfy a signal and power quality threshold. For example, when processing signals from multiple base stations 130, 131, 132, the UE 110 can ignore or filter out base stations 130, 131, 132 and/or broadcast signals that do not satisfy at least one of the signal and/or power quality threshold. In some cases, the UE 110 can prioritize the identified base stations 130, 131, 132 based at least in part on the power and quality of the signals and request communication with the identified base stations 130, 131, 132 based at least in part on the prioritization.

In some cases, the request for a secondary communication link is based at least in part on one or more of the broadcast signals. For example, in some cases, the UE 110 can use the broadcast signals to request for a secondary communication link with the communication system 200. In some cases, the request for a secondary communication link is part of a Random Access (RACH) procedure. For example, in some cases, the request for a secondary communication link can correspond to a random access preamble sequence. As another example, in some cases, the request for a secondary communication link can correspond to a Radio Resource Control (RRC) connection request. As another example, in some cases, the request for a secondary communication link can correspond to an RRC Connection Compete message.

At (5), the communication system 200 receives and/or processes the request for the secondary communication link. In some cases, processing the request for the secondary communication can include communicating or assigning one or more of a temporary identifier, timing information, uplink information, to the UE 110. For example, the communication system 200 can communicate a Random Access Response to the UE 110.

At (6), the communication system 200 responds to the request for the secondary communication link. In some cases, the response can establish the secondary communication link between the UE 110 and the communication system 200, provide the UE 110 with sufficient information to establish the secondary communication link with the communication system 200, and/or reject the UE 110. In some cases, the response to the request for the secondary communication link can include an acknowledgement. For example, the communication system 200 can acknowledge the UE's request for a RRC connection with an RRC Connection Complete message. In some cases, events (4), (5), and/or (6) correspond to Random Access (RACH) Procedure (RACH) Procedure. In some cases, events (4), (5), and/or (6) establish a Radio Resource Control (RRC) connection between the UE 110 and the communication system 200.

At (7), the UE 110 selects an identifier of a plurality of identifiers stored by the UE 110. As described herein the plurality of identifiers can be allocated to the UE 110 and stored by the UE 110, such an in memory of the UE 110. In some cases, each of the plurality of identifiers globally identify the same UE 110/mobile subscriber. For example, the same UE 110 can be associated with each of the plurality of identifiers such that any one of the plurality of identifiers can be utilized to authenticate an identity of the UE 110. Furthermore, each of the plurality of identifiers are registered with the network(s) to which the UE 110 is subscribed. For example, the communication system 200 (such as the HSS of the communication system 200) can also store the same plurality of identifiers so that the communication system 200 can authenticate the UE 110 after receiving (for example, in an attach request) any of the plurality of identifiers from the UE 110.

In some embodiments, the identifier includes at least one of an IMSI, a Mobile Country Code or MCC, a Mobile Network Code or MNC, a Mobile Station Identification Number or MSIN, a Mobile Station International Subscriber Directory Number or MSISDN, an International Mobile station Equipment Identity or IMEI, or a Globally Unique Temporary UE Identity or GUTI. However, it will be understood that a variety of identifiers can be included in the identifier.

In some embodiments, the UE 110 is equipped with a removable identification module, such as a SIM card. In some such cases, the plurality of identifiers can be programmed on the SIM card. In some cases, the UE 110 can select or identify the identifier stored on the removable identification module. In some cases, the UE 110 can select or identify an identifier that is not stored on the removable identification module. In this way, the UE 110 actively avoids selecting the identifier stored on removable identification module and instead selects an identifier that is stored in a location other than the removable identification module.

In some embodiments, the UE 110 selects an identifier from the plurality of identifiers stored by the UE based at least in part on a selection policy. In some cases, the selection policy can indicate that the identifier is to be selected from the plurality of identifiers randomly, based at least in part on an order (e.g., sequentially, chronologically, or alphabetically select an identifier as identifiers are used), based at least in part on repeatable (e.g., non-random) patterns, based at least in part on availability, based at least in part on previous selections, based at least in part on a time-based schedule, etc. For example, the selection policy can indicate to select an identifier that has not been used in an attach request by the UE 110 for X number of seconds, X number of minute(s), and so forth. As another example, the connection policy can indicate to select the identifier of the plurality of allocated identifiers that has been un-used for the longest period of time. For example, in instances in which the UE 110 cycles through and/or re-uses identifiers, the selection policy can indicate that the UE 110 select the identifier whose last use was the longest time ago.

At (8), the UE 110 can request a primary communication link. In some cases, prior to requesting the primary communication link, the UE 110 can determine whether to request the primary communication link based at least in part on the information described above, such as signal power and quality or broadcast signals. As part of the request, in some cases, the UE 110 can include sufficient information to enable the communication system 200 to authenticate the UE 110 and/or authorize the UE for the network. For example, as described herein, the request for the primary communication link can include the identifier selected at (7). In some cases, the information in the request can include network credentials, access identifiers, etc.

At (9), the communication system 200 or communication network associated with the communication system 200, can process the request and determine whether to establish the primary communication link with the UE 110. In some cases to determine whether to establish the primary communication link with the UE 110, the communication system 200, or associated communication network components, can consult one or more databases, such as an HSS, to authenticate the UE 110. For example, the communication system 200 or other communication network component can determine whether the UE 110 is registered with the network, such as, by determining whether the identifier is located in the one or more databases and identified as a registered user, etc. of the communication network. In certain embodiments, even if a UE 110 can be authenticated with the network, the communication system 200 can still deny access if the UE 110 does not have the proper access or permissions level.

At (10), based at least in part on the processing the base station can respond to the UE 110 request. In some cases, the response can establish the primary communication link between the UE 110 and the communication system 200, provide the UE 110 with sufficient information to establish the primary communication link with the communication system 200, and/or reject the UE 110. As mentioned previously, in some cases, the UE 110 can be rejected based at least in part on the identifier and/or authentication, etc. Once the primary communication link is established, the UE 110 can communicate with other devices within the network, such as other UE, servers, etc., via the communication system 200.

Depending on the embodiment, certain acts, events, blocks, communications or functions identified above can be performed in a different sequence, can be merged, or left out altogether (non-limiting example: not all described operations or events are necessary). For example, in some cases, any one or any combination of events (1), (2), (3), (4), (5), (6), (7), (8), (9), or (10) can be omitted. Further, in some embodiments, the UE 110 may not send a request for secondary communication link to the communication system 200. For example, the UE 110 can process signals received from the base station and request a primary communication link. Moreover, in certain embodiments, operations or events can be performed concurrently, e.g., the UE 110 can concurrently request a secondary and a primary communication link. In some embodiments, the communication system 200 can establish the primary communication link at the same time that it responds to the UE's 110 request for secondary communication link.

Furthermore, any one or any combination of the activities described above can occur automatically and/or without user input. For example, the UE 110 can receive the broadcast signals, process the signals, request the secondary communication link, request the primary communication link, and/or establish the secondary or primary communication link without user input.

Furthermore, it will be understood that, depending on the embodiment, certain acts, events, blocks, communications or functions identified above can be added. For example, in some cases, to reduce undesired communications, UE and communication systems can be implemented as UE-communication system pairs, such as a UE-base station pair described in greater detail in U.S. Pub. No. 2018/0288687 (the '687 Application), hereby incorporated herein by reference in its entirety. For example, the UE 110 of a UE-communication system pair can store an identifier (for example, an identifier associated with communication system 200), and the communication system 200 can be configured to that provide a matching or predetermined identifier to the UE 110. For example, the identifier can be communicated to the UE 110 in one or more of the signals broadcast by the communication system 200, such as in a SIB (e.g., in traditionally un-used bits, in one or more of the octets, etc.) and/or a MIB (e.g., in traditionally un-used bits, in one or more of the octets (such as the 3rd octet), etc.). In some cases, the UE 110 can identify the identifier from the broadcast signals and use identifier to identify whether the communication system 200 is part of the UE-communication system pair. In some cases, communication systems that do not provide the particular identifier can be rejected or ignored by the UE 110. For example, the UE 110 can be configured not to attempt to communicate (e.g., not attempt to establish a secondary communication link, primary communication link, etc.) with a communication system based at least in part on a determination that the broadcast signals do not include an identifier or do not include an anticipated identifier (e.g., an identifier matching an identifier stored by the UE 110). As a corollary, the UE 110 can be configured to attempt to communicate with a communication system based at least in part on a determination that the broadcast signals does include an identifier or does include an anticipated identifier.

Changing Identifiers

In some cases, the UE can "hide" by changing or cycling through a set of identifiers. For example, the UE can utilize a different identifier for each new attach request. In this way, it can reduce the likelihood or ease of using the intercepted identifier to track further communications by the UE.

Figure 4:
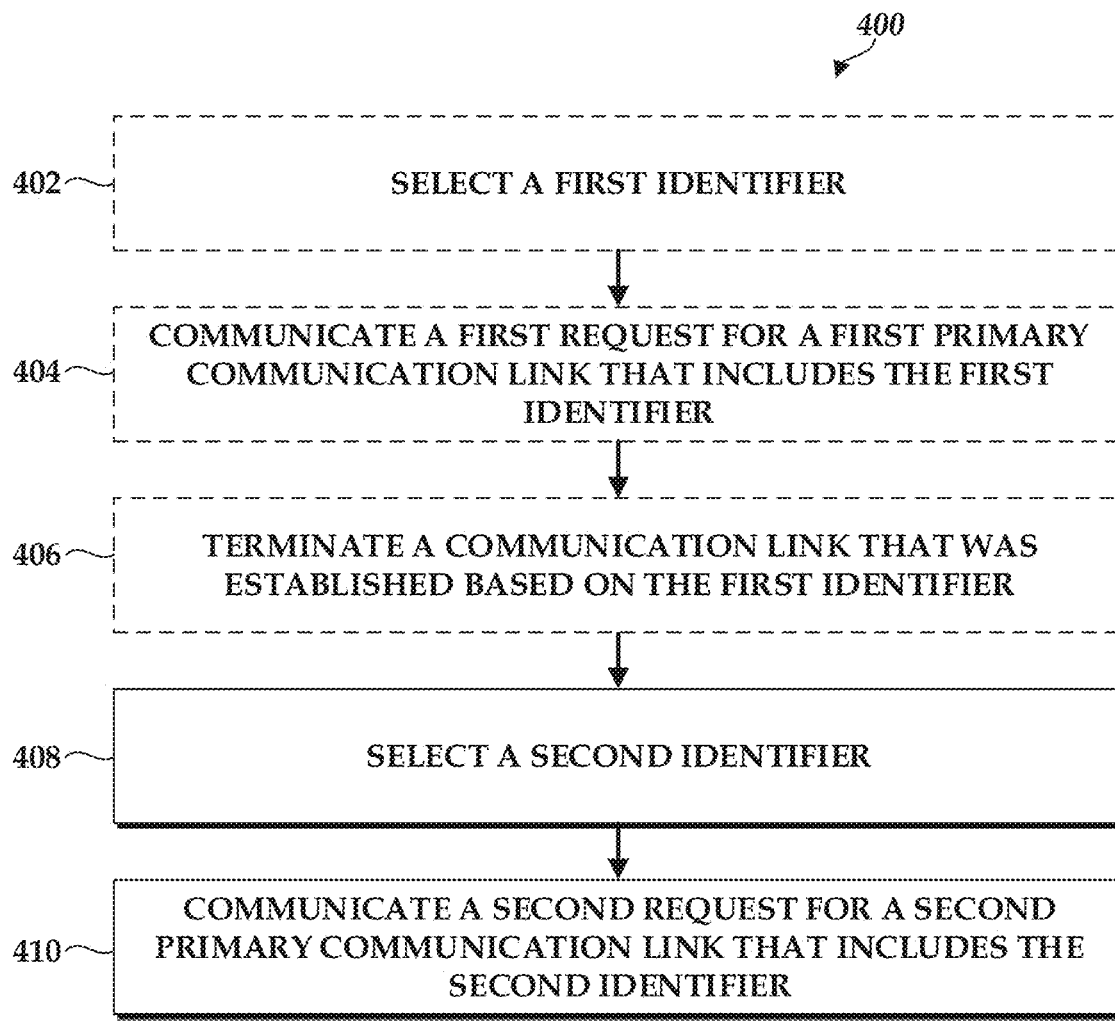
FIG. 4 is a flow diagram illustrative of an embodiment of a routine implemented by a UE for requesting multiple communication links with a base station.

FIG. 4 is a flow diagram illustrative of an embodiment of a routine 400 implemented by a UE 110 for establishing a communication link with a communication system 200. Additional, fewer, or different communications can occur between UE 110 and communication system 200, and/or additional components can be used to communicate the data between UE 110 and communication system 200.

At block 402, the UE 110 selects a first identifier from a plurality of identifiers stored by the UE. As described herein, the plurality of identifiers can be allocated and/or registered to the UE 110 such that any one of the plurality of identifiers stored by the UE can be utilized to authenticate the identity of the UE 110. In some cases, at least some of the plurality of identifiers are stored in the UE 110, such as in memory of the UE 110. In some cases, at least some of the plurality of identifiers provisioned to the UE 110, for example by a provisioning device not part of the communication system 200. The some cases, each of the plurality of identifiers are generated by the UE 110, for example rather than by the communication system 200. As described herein, the UE 110 can select the first identifier from the plurality of identifiers based at least in part on a selection policy.

At block 404, the UE 110 communicates a request for a first primary communication link with the communication system 200. As described herein, the request for the first primary communication link can include the first identifier selected at block 402. In some cases, prior to communicating the request for the first primary communication link, the UE 110 synchronizes with the communication system 200, communicates a request for a secondary communication link with the communication system 200, and/or a secondary communication link is established with the communication system 200.

As described herein, the communication system 200 can receive and process the request for the first primary communication link. Furthermore, the first primary communication link can be established based at least in part on the request for a first primary communication link. In some cases, the first primary communication link enables communications between the UE 110 and other UE accessible via a network associated with the communication system 200.

At block 406, the first primary communication link is terminated. As described herein, the first primary communication link can be terminated by the UE 110, the communication system 200, individually or in concert. As described herein, the first primary communication link can be terminated based at least in part on a connection policy.

At block 408, similar to block 402, the UE 110 selects a second identifier from the plurality of identifiers stored by the UE. The second identifier is different from the first identifier. As described herein, the second identifier can be selected based at least in part on a selection policy.

At block 410, similar to block 404, the UE 110 communicates a request for a second primary communication link with the communication system 200. As described herein, the request for the second primary communication link can include the second identifier selected at block 408. In some cases, prior to communicating the request for the second primary communication link, the UE 110 synchronizes with the communication system 200, communicates a request for a secondary communication link with the communication system 200, and/or a secondary communication link is established with the communication system 200.

In some cases, for example based at least in part on the establishment of the first primary communication link or the first secondary communication link, the UE 110 is already synchronized with the communication system 200 and/or already has synchronization data associated with the communication system 200. In some such cases, the UE 110 does not need to re-synchronize. In some such cases, the UE 110 must re-synchronize after the termination of the first primary communication link. In some cases, for example based at least in part on the establishment of the first primary communication link or the first secondary communication link, a second secondary communication link is not required to establish the second primary communication link.

As described herein, the communication system 200 can receive and process the request for the second primary communication link. Furthermore, the second primary communication link can be established based at least in part on the request for the second primary communication link. In some cases, the second primary communication link enables communications between the UE 110 and other UE accessible via a network associated with the communication system 200. Continuing with the example described above, in some cases, the communication system 200 includes a first base station and a second base station. In some such cases, the second primary communication link is a primary communication link between the UE 110 and the first base station. In some such cases, the second primary communication link is a primary communication link between the UE 110 and the second base station.

Depending on the embodiment, certain acts, events, blocks, or functions of any of the routine 400 can be performed in a different sequence or in parallel, can be added, merged, or left out altogether (non-limiting example: not all described operations or events are necessary for the practice of the routine 400). For example, in some cases, any one or any combination of blocks 402, 404, 406, 408, or 410 can be omitted. As another example, in some cases, the UE 110 can request a preliminary communication link prior to a primary communication link being established. Moreover, in certain embodiments, operations or events can be performed concurrently, e.g., the UE 110 can concurrently select an identifier and send a request for a preliminary communication link.

In some cases, the first primary communication link and the second primary communication link are established between the UE 110 and the same communication system. For example, the second primary communication link can be established between the UE 110 and the communication system 200 after the first primary communication link has been established and subsequently terminated. In some cases, the first primary communication link and the second primary communication link with different communication system. For example, the first primary communication link can be established between the UE 110 and a first communication system (e.g., the communication system associated with base station 130) and the second primary communication link can be established between the UE 110 and a second communication system (e.g., the communication system associated with base station 131).

Figure 5:
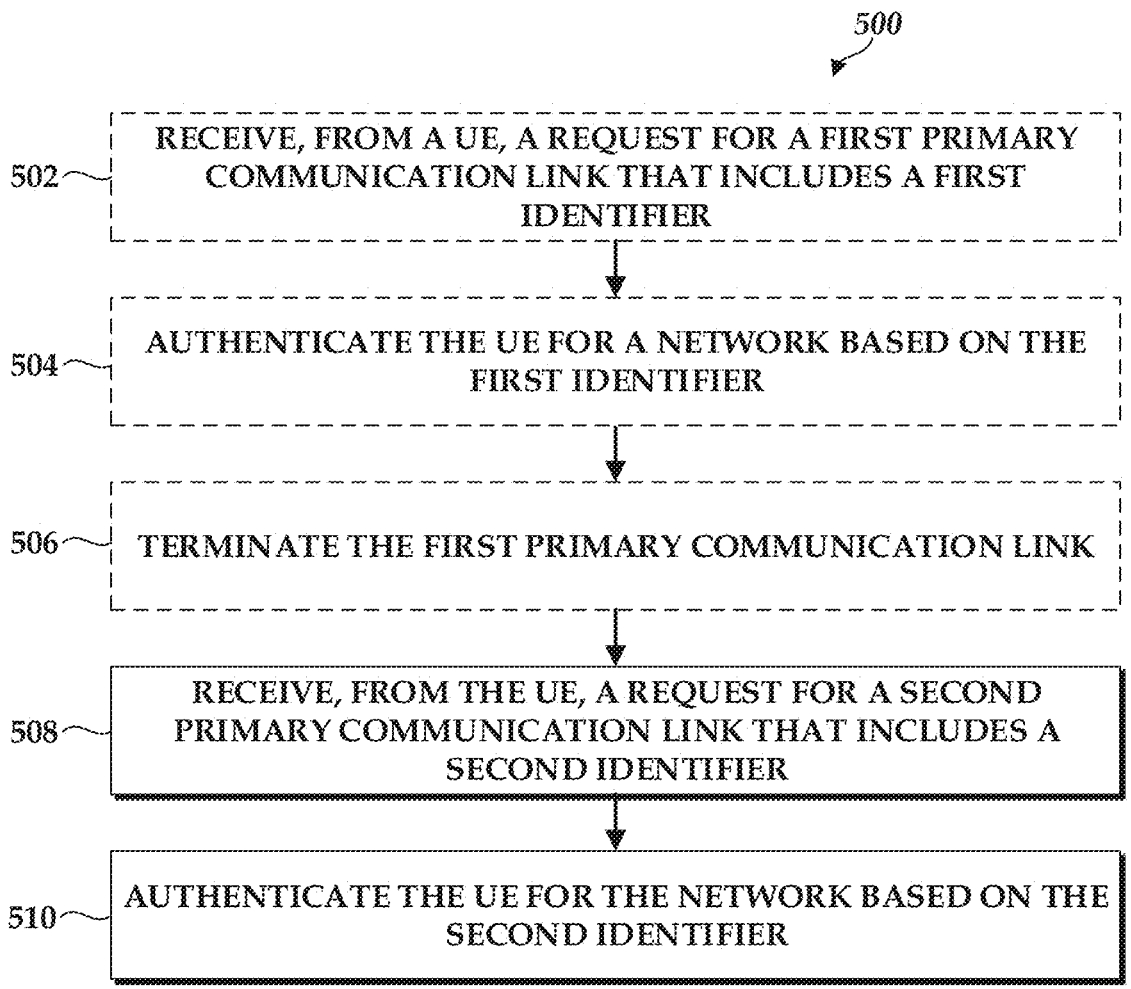
FIG. 5 is a flow diagram illustrative of an embodiment of a routine implemented by a base station for establishing multiple communication links with a UE.

FIG. 5 is a flow diagram illustrative of an embodiment of a routine 500 implemented by a communication system 200 for establishing multiple communication links with a UE 110. Additional, fewer, or different communications can occur between one or more UE and communication system 200, and/or additional components can be used to communicate the data between the one or more UE and communication system 200.

At block 502, the communication system 200 receives a request for a first primary communication link from the UE 110. As described herein, the request for the first primary communication link can include a first identifier from a plurality of identifiers stored by the UE 110. In some cases, prior to receiving the request for the first primary communication link, the UE 110 synchronizes with the communication system 200 and/or a secondary communication link is established between the communication system 200 and the UE 110.

At block 504, the UE 110 is authenticated for a network based at least in part on the first identifier included in the request for the first primary communication link. In some cases, the communication system 200 authenticates the UE 110 based at least in part on the first identifier. For example, as part of authenticating the UE 110, the communication system 200 can compare the first identifier with one or more identifiers stored in a data store, such as data store 254. In some cases, the communication system 200 can communicate or forward the request for the first primary communication link and/or the first identifier to a data store. For example, the communication system 200 can correspond to a base station, such as base station 130, and the communication system 200 can communicate or forward the request for the first primary communication link and/or the first identifier to a data store, such as data store 254, and the data store can compare the first identifier with one or more identifiers stored in the data store.

As described herein, the data store 254 can include subscription information for all UE (including client communications systems that are registered as UE) associated with the communication system 200, such as all the UE located within the coverage area of a communication system 200 and/or the UE located within the coverage area of related or associated communication systems 200. Further, the data store can include an indication of each of the plurality of identifiers stored by the UE 110. In some cases, if the first identifier matches an identifier in the data store, the UE 110 is authenticated for the network. In some cases, additional steps may occur before the UE 110 is authenticated for the network. For example, the communication system 200 can provide the UE 110 with one or more keys, authentication parameters, etc. and request a response to the UE. In some such cases, the communication system 200 can compare a response from the UE 110 to an expected response and can authenticate the UE 110 if the UE's response matches the expected response.

The first primary communication link can be established based at least in part on the request for the first primary communication link and/or the authentication of the UE 110 for the network associated with the communication system 200. In some cases, the first primary communication link enables communications between the UE 110 and other UE accessible via the network.

At block 506, similar to block 406 of FIG. 4, the first primary communication link is terminated. As described herein, the first primary communication link can be terminated by the UE 110, the communication system 200, individually or in concert. As described herein, the first primary communication link can be terminated based at least in part on a connection policy.

At block 508, similar to block 404 of FIG. 4, the communication system 200 receives a request for a second primary communication link from the UE 110. As described herein, the request for the first primary communication link can include a second identifier from a plurality of identifiers stored by the UE 110. The second identifier is different from the first identifier. In some cases, prior to receiving the request for the second primary communication link, the UE 110 synchronizes with the communication system 200 and/or a secondary communication link is established between the communication system 200 and the UE 110.

At block 510, similar to block 504, the UE 110 is authenticated for the network based at least in part on the second identifier included in the request for the second primary communication link. Furthermore, the second primary communication link is established based at least in part on the second identifier and/or the authentication of the UE 110 for the network.

Depending on the embodiment, certain acts, events, blocks, or functions of any of the routine 500 can be performed in a different sequence or in parallel, can be added, merged, or left out altogether (non-limiting example: not all described operations or events are necessary for the practice of the routine 500). For example, in some cases, any one or any combination of blocks 4502, 504, 506, 508, or 510 can be omitted. Moreover, in certain embodiments, operations or events can be performed concurrently, e.g., the communication system can concurrently receive a request and authenticate the UE. Furthermore, it will be understood that the routine 500 can include fewer or more blocks as desired. For example, in some embodiments, the communication system 200 can broadcast additional signals from which a UE can determine the strength and quality of a base station signal where the UE is located. In certain embodiments, the signals and additional signals can be combined into a single information block or a single set of information blocks. In some cases, rather than establish the first and/or second primary communication links with the UE, the communication system 200 can allow the UE to establish the communication links.

Diversion Communications

In some cases, a UE 110 can be utilized as a diversion or tactical device that is configured to communicate multiple diversion messages to a communication system 200. In some cases, the messages can appear, from the perspective of an eavesdropping device, as if they are coming from multiple UE, when in fact they are coming from a single UE (or few UEs). In this way, one or few UEs can give the impression of many UEs, which may confuse or overwhelm an eavesdropping device and/or a communication system 200.

Figure 6:
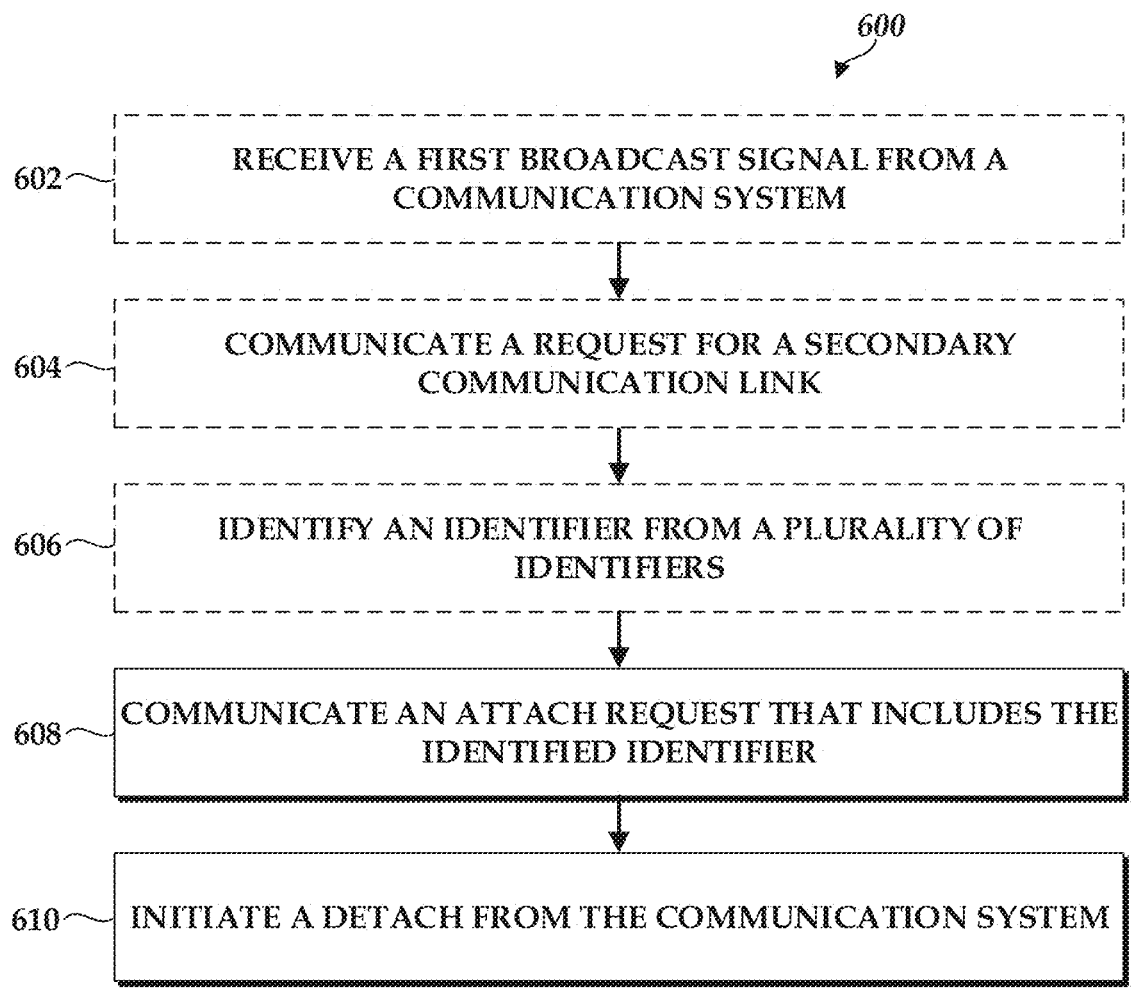
FIG. 6 is a flow diagram illustrative of an embodiment of a routine implemented by a UE to communicate multiple diversion messages to a communication system.

FIG. 6 is a flow diagram illustrative of an embodiment of a routine 600 implemented by a UE 110 to communicate multiple diversion messages to a communication system 200. Additional, fewer, or different communications can occur between UE 110 and communication system 200, and/or additional components can be used to communicate the messages between UE 110 and communication system 200.

At block 602, similar to (3) of FIG. 3, the UE 110 receives one or more broadcast signals and processes the received signals. For example, similar to (2) of FIG. 3, the UE 110 can scan one or more frequency bands for the broadcast signals. As described herein, in some cases, the UE 110 determines to scan the one or more frequency bands based at least in part on a connection policy. Furthermore, in some cases, as described herein, the UE 110 may initiate detach from the communication system 200 (or another communication system) prior to scanning the frequency bands, receiving the broadcast signals, and/or processing the received signals.

At block 604, similar to (4) of FIG. 3, the UE 110 communicates a request for a secondary communication link with the communication system 200. As described herein, in some cases, the request for a secondary communication link is part of, or can initiate, a Random Access (RACH) procedure, which can result in a secondary communication link being established between the UE 110 and the communication system 200. In some cases, prior to communicating the request for the secondary communication link, the UE 110 synchronizes with the communication system 200.

At block 606, similar to blocks 402 and/or 408 of FIG. 4, the UE 110 identifies or selects an identifier from a plurality of identifiers stored by the UE 110 (or elsewhere). As described herein, the plurality of identifiers can be allocated and/or registered with the network to which the UE 110 desires to attach such that any one of the plurality of identifiers stored by the UE can be utilized to authenticate the identity of the UE 110. As described herein, the UE 110 can select the first identifier from the plurality of identifiers based at least in part on a selection policy. In some cases, each of the plurality of identifiers are used only once. In some cases, one or more of the plurality of identifiers can be used more than once. For example, the selection policy can indicate that two or more of the plurality of identifiers are cycled through.

At block 608, similar to block 404 of FIG. 4, the UE 110 communicates an attach request to the communication system 200. As described herein, in some cases, the attach request can be referred to as a request for a primary communication link. As described herein, the attach request can include the identifier identified at block 606. In some cases, similar to block 510 of FIG. 5, the communication system 200 authenticate the UE 110 based at least in part on the identifier in the attach request and establishes a primary communication link.

In some cases, the request for a secondary communication link and/or the attach request are diversion communications. For example, in some cases, the diversion communications are not intended to establish a primary communication link, but rather merely appear (e.g., from the perspective of an eavesdropping device) as though one or more UE 110 is attempting to establish communication links with the communication system. In this way, if an eavesdropping device is intercepting messages, it will appear from the perspective of the eavesdropping device, that multiple UE are in the area.

In some cases, the identifier in the attach request need not be valid. For example, in some cases, the identified identifier is fake, erroneous, or invalid with respect to the network associated with the communication system 200 such that the identifier cannot be used to successfully identify the UE 110, successfully authenticate the UE 110, successfully authorize the UE 110, or the like. For example, the identifier can include a random or sequential sequence of numbers and/or characters. Thus, in some cases, the communication system 200 determines that the UE 110 is not authenticated for the network based at least in part on the identifier in the attach request. In this way, in some cases, the UE 110 can communicate with the network but the communication system 200 does not establish a primary communication link. For example, although in communication with the communication system, application level data may not be sent.

In some cases, the identifier in the attach request is a valid identifier (e.g., an identifier registered with the network associated with the communication system 200). For example, in some cases, it may appear suspicious (e.g., from the perspective of the communication system 200, from the perspective of an eavesdropping device, etc.) if the network receives a threshold number of failed access attempts. For example, the failed access attempts could be mistaken as unauthorized attempts by a malicious party. In some such embodiments, the UE can establish a primary communication link using the valid identifier and send application level data or other data.

At block 610, the UE 110 initiates a detach from the communication system 200. In some cases, initiating the detach is similar to block 406 of FIG. 4 and/or block 506 of FIG. 5, in which a primary communication link is terminated by the UE 110, the communication system 200, individually or in concert. In some cases, the UE 110 initiates a detach based at least in part on a connection policy, as described herein.

In some cases, initiating a detach and/or detaching from the communication system 200 releases resources relating to the UE 110, allowing the UE 110 to re-perform routine 600. For example, in some cases, the UE 110 performs routine 600 over and over again, each time identifying a different identifier at block 606. In some cases, the diversion messages (e.g., the requests at block 604 and/or 608) can be communicated in succession (e.g., one after another) and/or in parallel (e.g., two or more at concurrent times). For example, in some cases, the UE 110 can be configured to concurrently communicate multiple attach requests, with each attach request including a different identifier, to one or more communication systems. In some such embodiments, the UE 110 may include multiple processors, modems, antennas, etc. in order to concurrently communicate the attach requests, etc. As another example, in some cases, the UE 110 can be configured to successively perform routine 600 such that the UE 100 successfully attaches and subsequently detaches from a network before the UE 110 attempts to re-attach to the same network.

Depending on the embodiment, certain acts, events, blocks, or functions of any of the routine 600 can be performed in a different sequence or in parallel, can be added, merged, or left out altogether (non-limiting example: not all described operations or events are necessary for the practice of the routine 600). For example, in some cases, any one or any combination of blocks 602, 604, 606, 608, or 610 can be omitted. Further, in some embodiments, the UE 110 may not send a request for secondary communication link to the communication system 200. For example, the UE 110 can process signals received from the base station and send an attach request. Moreover, in certain embodiments, operations or events can be performed concurrently, e.g., the UE 110 can concurrently request a secondary and send an attach request. As another example, in some cases, the UE 110 can concurrently identify the identifier and communicate an attach request that include the identifier.

Example Embodiments

Various example embodiments of the disclosure can be described in view of the following Clauses:

Clause 1. A method for establishing communication links with a communication system, the method comprising:

scanning one or more frequency bands for broadcast signals;

receiving at a user equipment (UE), a first broadcast signal from a communication system;

communicating a request for a first secondary communication link with the communication system based at least in part on the first broadcast signal;

based at least in part on the first secondary communication link being established, communicating a request for a first primary communication link with the communication system, wherein the request for the first primary communication link includes a first identifier from a plurality of identifiers stored by the UE, and wherein to establish the first primary communication link, the communication system uses the first identifier to authenticate the UE for a network associated with the communication system;

based at least in part on a connection policy, terminating the first primary communication link;

scanning the one or more frequency bands for broadcast signals;

receiving at the UE a second broadcast signal from the communication system;

communicating a request for a second secondary communication link with the communication system based at least in part on the second broadcast signal;

identifying a second identifier from the plurality of identifiers stored by the UE, wherein the second identifier is different from the first identifier; and based at least in part on the second secondary communication link being established, communicating a request for a second primary communication link with the communication system, wherein the request for the second primary communication link includes the second identifier, and wherein to establish the second primary communication link, the communication system uses the second identifier to authenticate the UE for the network associated with the communication system.

Clause 2. The method of Clause 1, wherein each identifier of the plurality of identifiers correspond to a different International Mobile Subscriber Identity (IMSI).

Clause 3. The method of any of the previous clauses, wherein the plurality of identifiers are stored in a location other than in an insertable subscriber identity module (SIM) card embedded in the UE.

Clause 4. The method of any of the previous clauses, wherein the connection policy indicates to terminate the first primary communication link based at least in part on a determination that the first primary communication link does not satisfy a connectivity threshold.

Clause 5. The method of any of the previous clauses, wherein the connection policy indicates to terminate the first primary communication link based at least in part on a determination that the first primary communication link has been established for a predetermined period of time.

Clause 6. The method of any of the previous clauses, wherein the connection policy indicates to terminate the first primary communication link based at least in part on a number of communications over the first primary communication link.

Clause 7. The method of Clause 6, wherein the connection policy indicates to terminate the first primary communication link based at least in part on a determination that a number of communications over the first primary communication link satisfies a communications threshold.

Clause 8. The method of any of the previous clauses, wherein the connection policy indicates to terminate the first primary communication link based at least in part on a location of the UE.

Clause 9. The method of Clause 8, wherein the connection policy indicates to terminate the first primary communication link based at least in part on a determination that the location of the UE does not satisfy a location threshold associated with a coverage area of the network.

Clause 10. The method of any of the previous clauses, wherein the connection policy indicates to terminate the first primary communication link based at least in part on a power status of the UE.

Clause 11. The method of any of the previous clauses, wherein the connection policy indicates to terminate the first primary communication link based at least in part on a power status of the UE.

Clause 12. The method of any of the previous clauses, wherein the UE is configured to include an insertable subscriber identity module (SIM) card, wherein the connection policy indicates to terminate the first primary communication link based at least in part on a determination that the UE does not include the SIM card.

Clause 13. The method of any of the previous clauses, wherein said terminating the first preliminary communication link comprises reducing power applied to an antenna of the UE.

Clause 14. The method of any of the previous clauses, wherein said terminating the first preliminary communication link comprises moving the UE outside of a coverage area of the network.

Clause 15. The method of any of the previous clauses, wherein said terminating the first preliminary communication link comprises determining that the first preliminary communication link does not satisfy a connectivity threshold.

Clause 16. The method of any of the previous clauses, wherein said terminating the first preliminary communication link comprises communicating a detach request to the communication system.

Clause 17. The method of any of the previous clauses, wherein said terminating the first preliminary communication link comprises receiving a detach request from the communication system.

Clause 18. The method of any of the previous clauses, wherein the first broadcast signal includes at least one of a master information block (MIB) or a system information block (SIB).

Clause 19. The method of any of the previous clauses, wherein the network is a mobile cellular network, and wherein the communication system comprises a mobile cellular network communication system that independently provides the mobile cellular network to a coverage area in which the UE is located.

Clause 20. The method of any of the previous clauses, wherein the communication system independently provides the network within a covered area without communication to another communication system.

Clause 21. The method of any of the previous clauses, wherein the communication system comprises a mobile cellular network (MCN) communication system, wherein the first primary communication link communicatively couples the UE to the MCN communication system, and wherein the second primary communication link communicatively couples the UE to the MCN communication system.

Clause 22. The method of any of the previous clauses, wherein the communication system comprises a first mobile cellular network (MCN) communication system and a second MCN communication system, wherein the first primary communication link communicatively couples the UE to the first MCN communication system, and wherein the second primary communication link communicatively couples the UE to the second MCN communication system.

Clause 23. The method of any of the previous clauses, wherein the communication system is a base station.

Clause 24. The method of any of the previous clauses, wherein the plurality of identifiers are not generated by the communication system.

Clause 25. The method of any of the previous clauses, wherein the plurality of identifiers are generated by the communication system.

Clause 26. The method of any of the previous clauses, further comprising:
prior to said terminating the first primary communication link, communicating over the first primary communication link using a temporary identifier generated by the communication system.

Clause 27. The method of any of the previous clauses, wherein the first and second secondary communication links are established based at least in part on a Random Access (RACH) procedure.

Clause 28. The method of any of the previous clauses, wherein the first and second secondary communication links enable communications between the UE and the communication system.

Clause 29. The method of any of the previous clauses, wherein the first and second secondary communication links do not enable communications between the UE and other UE accessible via the network.

Clause 30. The method of any of the previous clauses, wherein the first and second primary communication links enable communications between the UE and other UE accessible via the network.

Clause 31. The method of any of the previous clauses, further comprising receiving the plurality of identifiers from a system other than the communication system.

Clause 32. The method of any of the previous clauses, further comprising receiving the plurality of identifiers from the communication system.

Clause 33. The method of any of the previous clauses, wherein the method is performed by the UE while a location of the UE satisfies a location threshold associated with a coverage area of the network.

Example Embodiments

Various example embodiments of the disclosure can be described in view of the following Clauses:
Clause 1. A system comprising:
a user equipment (UE) storing a plurality of identifiers and configured to:

scan one or more frequency bands for broadcast signals;
receive a first broadcast signal from a communication system;
communicate a request for a first secondary communication link with the communication system based at least in part on the first broadcast signal;
based at least in part on the first secondary communication link being established, communicate a request for a first primary communication link with the communication system, wherein the request for the first primary communication link includes a first identifier from the plurality of identifiers, and wherein to establish the first primary communication link, the communication system uses the first identifier to authenticate the UE for a network associated with the communication system;
based at least in part on a connection policy, terminate the first primary communication link;
scan the one or more frequency bands for broadcast signals;
receive a second broadcast signal from the communication system;
communicate a request for a second secondary communication link with the communication system based at least in part on the second broadcast signal;
identify a second identifier from the plurality of identifiers, wherein the second identifier is different from the first identifier; and
based at least in part on the second secondary communication link being established, communicate a request for a second primary communication link with the communication system, wherein the request for the second primary communication link includes the second identifier, and wherein to establish the second primary communication link, the communication system uses the second identifier to authenticate the UE for the network associated with the communication system.

Clause 2. The system of Clause 1, wherein each identifier of the plurality of identifiers correspond to a different International Mobile Subscriber Identity (IMSI).

Clause 3. The system of any of the previous clauses, wherein the plurality of identifiers are stored in a location other than in an insertable subscriber identity module (SIM) card embedded in the UE.

Clause 4. The method of Clause 1, wherein the connection policy indicates to terminate the first primary communication link based at least in part on a determination that the first primary communication link does not satisfy a connectivity threshold.

Clause 5. The system of any of the previous clauses, wherein the connection policy indicates to terminate the first primary communication link based at least in part on a determination that the first primary communication link has been established for a predetermined period of time.

Clause 6. The system of any of the previous clauses, wherein the connection policy indicates to terminate the first primary communication link based at least in part on a number of communications over the first primary communication link.

Clause 7. The system of Clause 6, wherein the connection policy indicates to terminate the first primary communication link based at least in part on a determination that a number of communications over the first primary communication link satisfies a communications threshold.

Clause 8. The system of any of the previous clauses, wherein the connection policy indicates to terminate the first primary communication link based at least in part on a location of the UE.

Clause 9. The system of Clause 8, wherein the connection policy indicates to terminate the first primary communication link based at least in part on a determination that the location of the UE does not satisfy a location threshold associated with a coverage area of the network.

Clause 10. The system of any of the previous clauses, wherein the connection policy indicates to terminate the first primary communication link based at least in part on a power status of the UE.

Clause 11. The system of any of the previous clauses, wherein the connection policy indicates to terminate the first primary communication link based at least in part on a power status of the UE.

Clause 12. The system of any of the previous clauses, wherein the UE is further configured to include an insertable subscriber identity module (SIM) card, wherein the connection policy indicates to terminate the first primary communication link based at least in part on a determination that the UE does not include the SIM card.

Clause 13. The system of any of the previous clauses, wherein to terminate the first preliminary communication link, the UE is configured to reduce power applied to an antenna of the UE.

Clause 14. The system of any of the previous clauses, wherein to terminate the first preliminary communication link, the UE is configured to move outside of a coverage area of the network.

Clause 15. The system of any of the previous clauses, wherein to terminate the first preliminary communication link, the UE is configured to determine that the first preliminary communication link does not satisfy a connectivity threshold.

Clause 16. The system of any of the previous clauses, wherein to terminate the first preliminary communication link, the UE is configured to communicate a detach request to the communication system.

Clause 17. The system of any of the previous clauses, wherein to terminate the first preliminary communication link, the UE is configured to receive a detach request from the communication system.

Clause 18. The system of any of the previous clauses, wherein the first broadcast signal includes at least one of a master information block (MIB) or a system information block (SIB).

Clause 19. The system of any of the previous clauses, wherein the network is a mobile cellular network, and wherein the communication system comprises a mobile cellular network communication system that independently provides the mobile cellular network to a coverage area in which the UE is located.

Clause 20. The system of any of the previous clauses, wherein the communication system independently provides the network within a covered area without communication to another communication system.

Clause 21. The system of any of the previous clauses, wherein the communication system comprises a mobile cellular network (MCN) communication system, wherein the first primary communication link communicatively couples the UE to the MCN communication system, and wherein the second primary communication link communicatively couples the UE to the MCN communication system.

Clause 22. The system of any of the previous clauses, wherein the communication system comprises a first mobile cellular network (MCN) communication system and a second MCN communication system, wherein the first primary communication link communicatively couples the UE to the first MCN communication system, and wherein the second primary communication link communicatively couples the UE to the second MCN communication system.

Clause 23. The system of any of the previous clauses, wherein the communication system is a base station.

Clause 24. The system of any of the previous clauses, wherein the plurality of identifiers are not generated by the communication system.

Clause 25. The system of any of the previous clauses, wherein the plurality of identifiers are generated by the communication system.

Clause 26. The system of any of the previous clauses, wherein the UE is further configured to, prior to terminating the first primary communication link, communicate over the first primary communication link using a temporary identifier generated by the communication system.

Clause 27. The system of any of the previous clauses, wherein the first and second secondary communication links are established based at least in part on a Random Access (RACH) procedure.

Clause 28. The system of any of the previous clauses, wherein the first and second secondary communication links enable communications between the UE and the communication system.

Clause 29. The system of any of the previous clauses, wherein the first and second secondary communication links do not enable communications between the UE and other UE accessible via the network.

Clause 30. The system of any of the previous clauses, wherein the first and second primary communication links enable communications between the UE and other UE accessible via the network.

Clause 31. The system of any of the previous clauses, wherein the UE is further configured to receive the plurality of identifiers from a system other than the communication system.

Clause 32. The system of any of the previous clauses, wherein the UE is further configured to receive the plurality of identifiers from the communication system.

Example Embodiments

Various example embodiments of the disclosure can be described in view of the following Clauses:

Clause 1. A method for establishing a communication link with a communication system, the method comprising:
based at least in part on a connection policy, scanning one or more frequency bands for broadcast signals;
selecting, from a plurality of identifiers stored by the UE, a second identifier; and
communicating a request for a second primary communication link with a communication system, wherein the request for the second primary communication link includes the second identifier, and wherein to establish the second primary communication link, the communication system uses the second identifier to authenticate the UE for a network associated with the communication system,
wherein a first primary communication link is established based at least in part on the communication system receiving, from the UE, a request for the first primary communication link that includes a first identifier of the plurality of identifiers stored by the UE and authenticating the UE for the network associated with the communication system using the first identifier.

Clause 2. The method of Clause 1, wherein the method further comprises, terminating the first primary communication link with the communication system.

Clause 3. The method of Clause 2, wherein said terminating is based at least in part on the connection policy.

Clause 4. The method of any of the previous clauses, further comprising receiving at the UE, a first broadcast signal from the communication system.

Clause 5. The method of Clause 4, wherein said selecting is based at least in part on said receiving the first broadcast signal.

Clause 6. The method of any of Clauses 4 or 5, further comprising communicating a request for a first secondary communication link with the communication system based at least in part on the first broadcast signal.

Clause 7. The method of any of Clauses 4-6, wherein said communicating a request for a second primary communication link with a communication system is based at least in part on the first secondary communication link being established.

Clause 8. The method of Clause 4, wherein the first broadcast signal includes at least one of a master information block (MIB) or a system information block (SIB).

Clause 9. The method of any of the previous clauses, wherein each identifier of the plurality of identifiers corresponds to a different International Mobile Subscriber Identity (IMSI).

Clause 10. The method of any of the previous clauses, wherein the plurality of identifiers are stored in a location other than in an insertable subscriber identity module (SIM) card embedded in the UE.

Clause 11. The method of any of the previous clauses, wherein the connection policy indicates to terminate a first primary communication link and/or scan the one or more frequency bands based at least in part on a determination that the first primary communication link does not satisfy a connectivity threshold.

Clause 12. The method of any of the previous clauses, wherein the connection policy indicates to terminate a first primary communication link and/or scan the one or more frequency bands based at least in part on a determination that the first primary communication link has been established for a predetermined period of time.

Clause 13. The method of any of the previous clauses, wherein the connection policy indicates to terminate a first primary communication link and/or scan the one or more frequency bands based at least in part on a number of communications over the first primary communication link.

Clause 14. The method of any of the previous clauses 3, wherein the connection policy indicates to terminate a first primary communication link and/or scan the one or more frequency bands based at least in part on a determination that a number of communications over the first primary communication link satisfies a communications threshold.

Clause 15. The method of any of the previous clauses, wherein the connection policy indicates to terminate a first primary communication link and/or scan the one or more frequency bands based at least in part on a location of the UE.

Clause 16. The method of any of the previous clauses, wherein the connection policy indicates to terminate a first primary communication link and/or scan the one or more frequency bands based at least in part on a determination that the location of the UE does not satisfy a location threshold associated with a coverage area of the network.

Clause 17. The method of any of the previous clauses, wherein the connection policy indicates to terminate a first primary communication link and/or scan the one or more frequency bands based at least in part on a power status of the UE.

Clause 18. The method of any of the previous clauses, wherein the connection policy indicates to terminate a first primary communication link and/or scan the one or more frequency bands based at least in part on a power status of the UE.

Clause 19. The method of any of the previous clauses, wherein the UE is configured to include an insertable subscriber identity module (SIM) card, wherein the connection policy indicates to terminate a first primary communication link and/or scan the one or more frequency bands based at least in part on a determination that the UE does not include the SIM card.

Clause 20. The method of any of the previous clauses, further comprising terminating a first preliminary communication link, wherein said terminating the first preliminary communication link comprises reducing power applied to an antenna of the UE.

Clause 21. The method of any of the previous clauses, further comprising terminating a first preliminary communication link, wherein said terminating the first preliminary communication link comprises moving the UE outside of a coverage area of the network.

Clause 22. The method of any of the previous clauses, further comprising terminating a first preliminary communication link, wherein said terminating the first preliminary communication link comprises determining that the first preliminary communication link does not satisfy a connectivity threshold.

Clause 23. The method of any of the previous clauses, further comprising terminating a first preliminary communication link, wherein said terminating the first preliminary communication link comprises communicating a detach request to the communication system.

Clause 24. The method of any of the previous clauses, further comprising terminating a first preliminary communication link, wherein said terminating the first preliminary communication link comprises receiving a detach request from the communication system.

Clause 25. The method of any of the previous clauses, wherein the network is a mobile cellular network, and wherein the communication system comprises a mobile cellular network communication system that independently provides the mobile cellular network to a coverage area in which the UE is located.

Clause 26. The method of any of the previous clauses, wherein the communication system independently provides the network within a covered area without communication to another communication system.

Clause 27. The method of any of the previous clauses, wherein the communication system comprises a mobile cellular network (MCN) communication system, wherein the first primary communication link communicatively couples the UE to the MCN communication system, and wherein the second primary communication link communicatively couples the UE to the MCN communication system.

Clause 28. The method of any of the previous clauses, wherein the communication system comprises a first mobile cellular network (MCN) communication system and a second MCN communication system, wherein the first primary communication link communicatively couples the UE to the first MCN communication system, and wherein the second primary communication link communicatively couples the UE to the second MCN communication system.

Clause 29. The method of any of the previous clauses, wherein the communication system is a base station.

Clause 30. The method of any of the previous clauses, wherein the plurality of identifiers are not generated by the communication system.

Clause 31. The method of any of the previous clauses, wherein the plurality of identifiers are generated by the communication system.

Clause 32. The method of any of the previous clauses, further comprising prior to terminating a first primary communication link, communicating over the first primary communication link using a temporary identifier generated by the communication system.

Clause 33. The method of any of the previous clauses, wherein first and second secondary communication links are established based at least in part on a Random Access (RACH) procedure.

Clause 34. The method of Clause 33, wherein first and second secondary communication links enable communications between the UE and the communication system.

Clause 35. The method of any of Clauses 33 or 34, wherein the first and second secondary communication links do not enable communications between the UE and other UE accessible via the network.

Clause 36. The method of any of the previous clauses, wherein the first and second primary communication links enable communications between the UE and other UE accessible via the network.

Clause 37. The method of any of the previous clauses, further comprising receiving the plurality of identifiers from a system other than the communication system.

Clause 38. The method of any of the previous clauses, further comprising receiving the plurality of identifiers from the communication system.

Clause 39. The method of any of the previous clauses, wherein the method is performed by the UE while a location of the UE satisfies a location threshold associated with a coverage area of the network.

Example Embodiments

Various example embodiments of the disclosure can be described in view of the following Clauses:

Clause 1. A system comprising:
a user equipment (UE) storing a plurality of identifiers and configured to:
based at least in part on a connection policy, scan one or more frequency bands for broadcast signals;
select, from a plurality of identifiers stored by the UE, a second identifier; and
communicate a request for a second primary communication link with a communication system, wherein the request for the second primary communication link includes the second identifier, and wherein to establish the second primary communication link, the communication system uses the second identifier to authenticate the UE for a network associated with the communication system,
wherein a first primary communication link is established based at least in part on the communication system receiving, from the UE, a request for the first primary communication link that includes a first identifier of the plurality of identifiers stored by the UE and authenticating the UE for the network associated with the communication system using the first identifier.

Clause 2. The system of Clause 1, wherein the UE is further configured to terminate the first primary communication link with the communication system.

Clause 3. The system of Clause 2, wherein to terminate the first primary communication link, the UE is configured terminate the first primary communication link based at least in part on the connection policy.

Clause 4. The system of any of the previous clauses, wherein the UE is further configured to receive at the UE, a first broadcast signal from the communication system.

Clause 5. The system of Clause 4, wherein to select the second identifier, the UE is configured to select the second identifier based at least in part on the first broadcast signal.

Clause 6. The system of any of Clauses 4 or 5, wherein the UE is further configured to communicate a request for a first secondary communication link with the communication system based at least in part on the first broadcast signal.

Clause 7. The system of any of Clauses 4-6, wherein to communicate the request for the second primary communication link, the UE is further configured to communicate the request for the second primary communication link based at least in part on the first secondary communication link being established.

Clause 8. The system of Clause 4, wherein the first broadcast signal includes at least one of a master information block (MIB) or a system information block (SIB).

Clause 9. The system of any of the previous clauses, wherein each identifier of the plurality of identifiers corresponds to a different International Mobile Subscriber Identity (IMSI).

Clause 10. The system of any of the previous clauses, wherein the plurality of identifiers are stored in a location other than in an insertable subscriber identity module (SIM) card embedded in the UE.

Clause 11. The system of any of the previous clauses, wherein the connection policy indicates to terminate a first primary communication link and/or scan the one or more frequency bands based at least in part on a determination that the first primary communication link does not satisfy a connectivity threshold.

Clause 12. The system of any of the previous clauses, wherein the connection policy indicates to terminate a first primary communication link and/or scan the one or more frequency bands based at least in part on a determination that the first primary communication link has been established for a predetermined period of time.

Clause 13. The system of any of the previous clauses, wherein the connection policy indicates to terminate a first primary communication link and/or scan the one or more frequency bands based at least in part on a number of communications over the first primary communication link.

Clause 14. The system of any of the previous clauses 3, wherein the connection policy indicates to terminate a first primary communication link and/or scan the one or more frequency bands based at least in part on a determination that a number of communications over the first primary communication link satisfies a communications threshold.

Clause 15. The system of any of the previous clauses, wherein the connection policy indicates to terminate a first primary communication link and/or scan the one or more frequency bands based at least in part on a location of the UE.

Clause 16. The system of any of the previous clauses, wherein the connection policy indicates to terminate a first primary communication link and/or scan the one or more frequency bands based at least in part on a determination that the location of the UE does not satisfy a location threshold associated with a coverage area of the network.

Clause 17. The system of any of the previous clauses, wherein the connection policy indicates to terminate a first primary communication link and/or scan the one or more frequency bands based at least in part on a power status of the UE.

Clause 18. The system of any of the previous clauses, wherein the connection policy indicates to terminate a first primary communication link and/or scan the one or more frequency bands based at least in part on a power status of the UE.

Clause 19. The system of any of the previous clauses, wherein the UE is further configured to include an insertable subscriber identity module (SIM) card, wherein the connection policy indicates to terminate a first primary communication link and/or scan the one or more frequency bands based at least in part on a determination that the UE does not include the SIM card.

Clause 20. The system of any of the previous clauses, wherein the UE is further configured to terminate a first preliminary communication link by reducing power applied to an antenna of the UE.

Clause 21. The system of any of the previous clauses, wherein the UE is further configured to terminate a first preliminary communication link by moving the UE outside of a coverage area of the network.

Clause 22. The system of any of the previous clauses, wherein the UE is further configured to terminate a first preliminary communication link based at least in part on a determination that the first preliminary communication link does not satisfy a connectivity threshold.

Clause 23. The system of any of the previous clauses, wherein the UE is further configured to terminate a first preliminary communication link by communicating a detach request to the communication system.

Clause 24. The system of any of the previous clauses, wherein the UE is further configured to terminate a first preliminary communication link based at least in part on a detach request received from the communication system.

Clause 25. The system of any of the previous clauses, wherein the network is a mobile cellular network, and wherein the communication system comprises a mobile cellular network communication system that independently provides the mobile cellular network to a coverage area in which the UE is located.

Clause 26. The system of any of the previous clauses, wherein the communication system independently provides the network within a covered area without communication to another communication system.

Clause 27. The system of any of the previous clauses, wherein the communication system comprises a mobile cellular network (MCN) communication system, wherein the first primary communication link communicatively couples the UE to the MCN communication system, and wherein the second primary communication link communicatively couples the UE to the MCN communication system.

Clause 28. The system of any of the previous clauses, wherein the communication system comprises a first mobile cellular network (MCN) communication system and a second MCN communication system, wherein the first primary communication link communicatively couples the UE to the first MCN communication system, and wherein the second primary communication link communicatively couples the UE to the second MCN communication system.

Clause 29. The system of any of the previous clauses, wherein the communication system is a base station.

Clause 30. The system of any of the previous clauses, wherein the plurality of identifiers are not generated by the communication system.

Clause 31. The system of any of the previous clauses, wherein the plurality of identifiers are generated by the communication system.

Clause 32. The system of any of the previous clauses, prior to terminating a first primary communication link, wherein the UE is further configured to communicate over the first primary communication link using a temporary identifier generated by the communication system.

Clause 33. The system of any of the previous clauses, wherein first and second secondary communication links are established based at least in part on a Random Access (RACH) procedure.

Clause 34. The system of Clause 33, wherein first and second secondary communication links enable communications between the UE and the communication system.

Clause 35. The system of any of Clauses 33 or 34, wherein the first and second secondary communication links do not enable communications between the UE and other UE accessible via the network.

Clause 36. The system of any of the previous clauses, wherein the first and second primary communication links enable communications between the UE and other UE accessible via the network.

Clause 37. The system of any of the previous clauses, wherein the UE is further configured to receive the plurality of identifiers from a system other than the communication system.

Clause 38. The system of any of the previous clauses, wherein the UE is further configured to receive the plurality of identifiers from the communication system.

Example Embodiments

Various example embodiments of the disclosure can be described in view of the following Clauses:

Clause 1. A method for establishing communication links with a user equipment (UE), the method comprising:

receiving, at a communication system and from the user equipment (UE), a request for a first primary communication link, wherein the request for the first primary communication link includes a first identifier from a plurality of identifiers stored by the UE;

authenticating the UE for a network based at least in part on the first identifier, wherein the first primary communication link is established based at least in part on said authenticating the UE for the network based at least in part on the first identifier;

terminating the first primary communication link;

receiving, from the user equipment (UE) a request for a second primary communication link, wherein the request for the second primary communication link includes a second identifier from the plurality of identifiers stored by the UE; and authenticating the UE for the network based at least in part on the second identifier, wherein the second primary communication link is established based at least in part on said authenticating the UE for the network based at least in part on the second identifier.

Clause 2. The method of Clause 1, wherein said terminating is based at least in part on a connection policy.

Clause 3. The method of any of the previous clauses, further comprising communicating a first broadcast signal.

Clause 4. The method of Clause 3, wherein the first broadcast signal includes at least one of a master information block (MIB) or a system information block (SIB).

Clause 5. The method of any of the previous clauses, wherein each identifier of the plurality of identifiers corresponds to a different International Mobile Subscriber Identity (IMSI).

Clause 6. The method of any of the previous clauses, wherein the plurality of identifiers are stored in a location other than in an insertable subscriber identity module (SIM) card embedded in the UE.

Clause 7. The method of any of the previous clauses, wherein the network is a mobile cellular network, and wherein the communication system comprises a mobile cellular network communication system that independently provides the mobile cellular network to a coverage area in which the UE is located.

Clause 8. The method of any of the previous clauses, wherein the communication system independently provides the network within a covered area without communication to another communication system.

Clause 9. The method of any of the previous clauses, wherein the communication system comprises a mobile cellular network (MCN) communication system, wherein the first primary communication link communicatively couples the UE to the MCN communication system, and wherein the second primary communication link communicatively couples the UE to the MCN communication system.

Clause 10. The method of any of the previous clauses, wherein the communication system comprises a first mobile cellular network (MCN) communication system and a second MCN communication system, wherein the first primary communication link communicatively couples the UE to the first MCN communication system, and wherein the second primary communication link communicatively couples the UE to the second MCN communication system.

Clause 11. The method of any of the previous clauses, wherein the communication system is a base station.

Clause 12. The method of any of the previous clauses, wherein the plurality of identifiers are not generated by the communication system.

Clause 13. The method of any of the previous clauses, further comprising generating the plurality of identifiers and communicating the plurality of identifiers to the UE.

Clause 14. The method of any of the previous clauses, wherein first and second secondary communication links are established based at least in part on a Random Access (RACH) procedure.

Clause 15. The method of Clause 15, wherein first and second secondary communication links enable communications between the UE and the communication system.

Clause 16. The method of any of Clauses 15 or 16, wherein the first and second secondary communication links do not enable communications between the UE and other UE accessible via the network.

Clause 17. The method of any of the previous clauses, wherein the first and second primary communication links enable communications between the UE and other UE accessible via the network.

Example Embodiments

Various example embodiments of the disclosure can be described in view of the following Clauses:

Clause 1. A system comprising:

a communication system configured to:

receive from a user equipment (UE) a request for a first primary communication link, wherein the request for the first primary communication link includes a first identifier from a plurality of identifiers stored by the UE;

authenticate the UE for a network based at least in part on the first identifier, wherein the first primary communication link is established based at least in part on said authenticating the UE for the network based at least in part on the first identifier;

terminate the first primary communication link;

receive, from the user equipment (UE) a request for a second primary communication link, wherein the request for the second primary communication link includes a second identifier from the plurality of identifiers stored by the UE; and authenticate the UE for the network based at least in part on the second identifier, wherein the second primary communication link is established based at least in part on said authenticating the UE for the network based at least in part on the second identifier.

Clause 2. The system of Clause 1, wherein the communication system is configured to terminate the first primary communication link based at least in part on a connection policy.

Clause 3. The system of any of the previous clauses, wherein the communication system is further configured to communicate a first broadcast signal.

Clause 4. The system of Clause 3, wherein the first broadcast signal includes at least one of a master information block (MIB) or a system information block (SIB).

Clause 5. The system of any of the previous clauses, wherein each identifier of the plurality of identifiers corresponds to a different International Mobile Subscriber Identity (IMSI).

Clause 6. The system of any of the previous clauses, wherein the plurality of identifiers are stored in a location other than in an insertable subscriber identity module (SIM) card embedded in the UE.

Clause 7. The system of any of the previous clauses, wherein the network is a mobile cellular network, and wherein the communication system comprises a mobile cellular network communication system that independently provides the mobile cellular network to a coverage area in which the UE is located.

Clause 8. The system of any of the previous clauses, wherein the communication system independently provides the network within a covered area without communication to another communication system.

Clause 9. The system of any of the previous clauses, wherein the communication system comprises a mobile cellular network (MCN) communication system, wherein the first primary communication link communicatively couples the UE to the MCN communication system, and wherein the second primary communication link communicatively couples the UE to the MCN communication system.

Clause 10. The system of any of the previous clauses, wherein the communication system comprises a first mobile cellular network (MCN) communication system and a second MCN communication system, wherein the first primary communication link communicatively couples the UE to the first MCN communication system, and wherein the second primary communication link communicatively couples the UE to the second MCN communication system.

Clause 11. The system of any of the previous clauses, wherein the communication system is a base station.

Clause 12. The system of any of the previous clauses, wherein the plurality of identifiers are not generated by the communication system.

Clause 13. The system of any of the previous clauses, wherein the communication system is configured to generate the plurality of identifiers and communicate the plurality of identifiers to the UE.

Clause 14. The system of any of the previous clauses, wherein first and second secondary communication links are established based at least in part on a Random Access (RACH) procedure.

Clause 15. The system of Clause 14, wherein first and second secondary communication links enable communications between the UE and the communication system.

Clause 16. The system of any of Clauses 14 or 15, wherein the first and second secondary communication links do not enable communications between the UE and other UE accessible via the network.

Clause 17. The system of any of the previous clauses, wherein the first and second primary communication links enable communications between the UE and other UE accessible via the network.

Example Embodiments

Various example embodiments of the disclosure can be described in view of the following Clauses:

Clause 1. A method for communicating attach requests, the system comprising:

for a configurable period of time, successively initiating attach requests, wherein initiating an attach request comprises:

receiving, at a user equipment (UE), one or more broadcast signals broadcast from a communication system;

communicating a request for a secondary communication link with the communication system;

identifying an identifier from a plurality of identifiers stored by the UE, wherein a different identifier is identified for each attach request; and communicating an attach request to the communication system, wherein the attach request includes the identified identifier; and initiating a detach from the communication system, wherein the detach terminates at least one of a secondary communication link with the communication system or a primary communication link with the communication system.

Clause 2. The method of Clause 1, wherein identifying the identifier comprises generating the identifier.

Clause 3. The method of any of the previous clauses, wherein the configurable period of time corresponds to a threshold number of initiated attach requests.

Clause 4. The method of any of the previous clauses, wherein said communicating the attach request is based at least in part on the secondary communication link being established.

Clause 5. The method of any of the previous clauses, wherein the one or more broadcast signals include at least one of a master information block (MIB) or a system information block (SIB).

Clause 6. The method of any of the previous clauses, wherein each identifier of the plurality of identifiers corresponds to a different International Mobile Subscriber Identity (IMSI).

Clause 7. The method of any of the previous clauses, wherein the plurality of identifiers are stored in a location other than in an insertable subscriber identity module (SIM) card embedded in the UE.

Clause 8. The method of any of the previous clauses, wherein said initiating the detach is based at least in part on a connection policy.

Clause 9. The method of Clause 8, wherein the connection policy indicates to terminate the primary communication link based at least in part on a determination that the first primary communication link does not satisfy a connectivity threshold.

Clause 10. The method of any of Clauses 8 or 9, wherein the connection policy indicates to terminate the primary communication link based at least in part on a determination that the primary communication link has been established for a predetermined period of time.

Clause 11. The method of any of Clauses 8-10, wherein the connection policy indicates to terminate the primary communication link based at least in part on a number of communications over the primary communication link.

Clause 12. The method of any of Clauses 8-11, wherein the connection policy indicates to terminate the primary communication link based at least in part on a determination that a number of communications over the primary communication link satisfies a communications threshold.

Clause 13. The method of any of Clauses 8-12 wherein the connection policy indicates to terminate the primary communication link based at least in part on a location of the UE.

Clause 14. The method of any of Clauses 8-13, wherein the connection policy indicates to terminate the primary communication link based at least in part on a determination that the location of the UE does not satisfy a location threshold associated with a coverage area of the network.

Clause 15. The method of any of Clauses 8-14, wherein the connection policy indicates to terminate the primary communication link based at least in part on a power status of the UE.

Clause 16. The method of any of Clauses 8-15, wherein the UE is configured to include an insertable subscriber identity module (SIM) card, wherein the connection policy indicates to terminate the primary communication link based at least in part on a determination that the UE does not include the SIM card.

Clause 17. The method of any of the previous clauses, wherein said initiating the detach comprising reducing power applied to an antenna of the UE.

Clause 18. The method of any of the previous clauses, wherein said initiating the detach comprising moving the UE outside of a coverage area of the network.

Clause 19. The method of any of the previous clauses, wherein said initiating the detach comprising determining that the first preliminary communication link does not satisfy a connectivity threshold.

Clause 20. The method of any of the previous clauses, wherein said initiating the detach comprising communicating a detach request to the communication system.

Clause 21. The method of any of the previous clauses, wherein said initiating the detach comprising receiving a detach request from the communication system.

Clause 22. The method of any of the previous clauses, wherein the network is a mobile cellular network, and wherein the communication system comprises a mobile cellular network communication system that independently provides the mobile cellular network to a coverage area in which the UE is located.

Clause 23. The method of any of the previous clauses, wherein the communication system independently provides the network within a covered area without communication to another communication system.

Clause 24. The method of any of the previous clauses, wherein the communication system is a base station.

Clause 25. The method of any of the previous clauses, wherein the plurality of identifiers are not generated by the communication system.

Clause 26. The method of any of the previous clauses, wherein the plurality of identifiers are generated by the communication system.

Clause 27. The method of any of the previous clauses, further comprising prior to terminating a primary communication link, communicating over the primary communication link using a temporary identifier generated by the communication system.

Clause 28. The method of any of the previous clauses, wherein secondary communication links are established based at least in part on a Random Access (RACH) procedure.

Clause 29. The method of Clause 28, wherein secondary communication links enable communications between the UE and the communication system.

Clause 30. The method of any of Clauses 28 or 29, wherein secondary communication links do not enable communications between the UE and other UE accessible via the network.

Clause 31. The method of any of the previous clauses, wherein primary communication links enable communications between the UE and other UE accessible via the network.

Clause 32. The method of any of the previous clauses, further comprising receiving the plurality of identifiers from a system other than the communication system.

Clause 33. The method of any of the previous clauses, further comprising receiving the plurality of identifiers from the communication system.

Clause 34. The method of any of the previous clauses, wherein the method is performed by the UE while a location of the UE satisfies a location threshold associated with a coverage area of the network.

Example Embodiments

Various example embodiments of the disclosure can be described in view of the following Clauses:

Clause 1. A system comprising:
a user equipment (UE) configured to:
for a configurable period of time, successively initiate attach requests, wherein to initiate an attach request, the UE is configured to:
receive one or more broadcast signals broadcast from a communication system;
communicate a request for a secondary communication link with the communication system;
identify an identifier from a plurality of identifiers stored by the UE, wherein a different identifier is identified for each attach request; and
communicating an attach request to the communication system, wherein the attach request includes the identified identifier; and
initiate a detach from the communication system, wherein the detach terminates at least one of a secondary communication link with the communication system or a primary communication link with the communication system.

Clause 2. The system of Clause 1, wherein to identify the identifier, the UE is configured to generate the identifier.

Clause 3. The system of any of the previous clauses, wherein the configurable period of time corresponds to a threshold number of initiated attach requests.

Clause 4. The system of any of the previous clauses, wherein to communicate the attach request, the UE is configured to communicate the attach request based at least in part on the secondary communication link being established.

Clause 5. The system of any of the previous clauses, wherein the one or more broadcast signals include at least one of a master information block (MIB) or a system information block (SIB).

Clause 6. The system of any of the previous clauses, wherein each identifier of the plurality of identifiers corresponds to a different International Mobile Subscriber Identity (IMSI).

Clause 7. The system of any of the previous clauses, wherein the plurality of identifiers are stored in a location other than in an insertable subscriber identity module (SIM) card embedded in the UE.

Clause 8. The system of any of the previous clauses, wherein to initiate the detach, the UE is configured to initiate the detach based at least in part on a connection policy.

Clause 9. The system of Clause 8, wherein the connection policy indicates to terminate the primary communication link based at least in part on a determination that the first primary communication link does not satisfy a connectivity threshold.

Clause 10. The system of any of Clauses 8 or 9, wherein the connection policy indicates to terminate the primary communication link based at least in part on a determination that the primary communication link has been established for a predetermined period of time.

Clause 11. The system of any of Clauses 8-10, wherein the connection policy indicates to terminate the primary communication link based at least in part on a number of communications over the primary communication link.

Clause 12. The system of any of Clauses 8-11, wherein the connection policy indicates to terminate the primary communication link based at least in part on a determination that a number of communications over the primary communication link satisfies a communications threshold.

Clause 13. The system of any of Clauses 8-12 wherein the connection policy indicates to terminate the primary communication link based at least in part on a location of the UE.

Clause 14. The system of any of Clauses 8-13, wherein the connection policy indicates to terminate the primary communication link based at least in part on a determination that the location of the UE does not satisfy a location threshold associated with a coverage area of the network.

Clause 15. The system of any of Clauses 8-14, wherein the connection policy indicates to terminate the primary communication link based at least in part on a power status of the UE.

Clause 16. The system of any of Clauses 8-15, wherein the UE is further configured to include an insertable subscriber identity module (SIM) card, wherein the connection policy indicates to terminate the primary communication link based at least in part on a determination that the UE does not include the SIM card.

Clause 17. The system of any of the previous clauses, wherein to initiate the detach, the UE is configured to reduce power applied to an antenna of the UE.

Clause 18. The system of any of the previous clauses, wherein to initiate the detach, the UE is configured to move the UE outside of a coverage area of the network.

Clause 19. The system of any of the previous clauses, wherein to initiate the detach, the UE is configured to determine that the first preliminary communication link does not satisfy a connectivity threshold.

Clause 20. The system of any of the previous clauses, wherein to initiate the detach, the UE is configured to communicate a detach request to the communication system.

Clause 21. The system of any of the previous clauses, wherein to initiate the detach, the UE is configured to receive a detach request from the communication system.

Clause 22. The system of any of the previous clauses, wherein the network is a mobile cellular network, and wherein the communication system comprises a mobile cellular network communication system that independently provides the mobile cellular network to a coverage area in which the UE is located.

Clause 23. The system of any of the previous clauses, wherein the communication system independently provides the network within a covered area without communication to another communication system.

Clause 24. The system of any of the previous clauses, wherein the communication system is a base station.

Clause 25. The system of any of the previous clauses, wherein the plurality of identifiers are not generated by the communication system.

Clause 26. The system of any of the previous clauses, wherein the plurality of identifiers are generated by the communication system.

Clause 27. The system of any of the previous clauses, wherein the UE is further configured to, prior to terminating a primary communication link, communicate over the primary communication link using a temporary identifier generated by the communication system.

Clause 28. The system of any of the previous clauses, wherein secondary communication links are established based at least in part on a Random Access (RACH) procedure.

Clause 29. The system of Clause 28, wherein secondary communication links enable communications between the UE and the communication system.

Clause 30. The system of any of Clauses 28 or 29, wherein secondary communication links do not enable communications between the UE and other UE accessible via the network.

Clause 31. The system of any of the previous clauses, wherein primary communication links enable communications between the UE and other UE accessible via the network.

Clause 32. The system of any of the previous clauses, wherein the UE is further configured to receive the plurality of identifiers from a system other than the communication system.

Clause 33. The system of any of the previous clauses, wherein the UE is further configured to receive the plurality of identifiers from the communication system.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (non-limiting example: not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based at least in part on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A method for establishing communication links with a communication system, the method comprising:

scanning one or more frequency bands for broadcast signals;

receiving at a user equipment (UE), a first broadcast signal from a communication system;

communicating a request to establish a first secondary communication link with the communication system based at least in part on the first broadcast signal;

based at least in part on the first secondary communication link being established, communicating a request to establish a first primary communication link with the communication system, wherein the request to establish the first primary communication link includes a first identifier from a plurality of identifiers stored by the UE, and wherein to establish the first primary communication link, the communication system is configured to use the first identifier to authenticate the UE for a network associated with the communication system;

after the first primary communication link is established and based at least in part on a connection policy, actively terminating the first primary communication link, wherein the connection policy indicates to actively terminate the first primary communication link based at least in part on at least one of a time-based schedule, a communication-based schedule or a connectivity threshold;

scanning the one or more frequency bands for broadcast signals;

receiving at the UE a second broadcast signal from the communication system;

communicating a request to establish a second secondary communication link with the communication system based at least in part on the second broadcast signal;

based at least in part on the connection policy, identifying a second identifier from the plurality of identifiers stored by the UE, wherein the second identifier is different from the first identifier; and based at least in part on the second secondary communication link being established, communicating a request to establish a second primary communication link with the communication system, wherein the request to establish the second primary communication link includes the second identifier, and wherein to establish the second primary communication link, the communication system is configured to use the second identifier without using the first identifier to authenticate the UE for the network associated with the communication system, wherein the communication system uses the first identifier during a first time period to establish the first primary communication link and uses the second identifier during a second time period to establish the second primary communication link, wherein the second time period is after the first time period.

2. A method for establishing a communication link with a communication system, the method comprising:

after a first primary communication link is established with a communication system and based at least in part on a connection policy, actively terminating the first primary communication link and scanning one or more frequency bands for broadcast signals, wherein the connection policy indicates to actively terminate the first primary communication link based at least in part on at least one of a time-based schedule, a communication-based schedule or a connectivity threshold;

based at least in part on the connection policy, selecting, from a plurality of identifiers stored by a user equipment (UE), a second identifier; and based at least in part on a second secondary communication link being established, communicating a request for a second primary communication link with the communication system, wherein the request for the second primary communication link includes the second identifier, and wherein to establish the second primary communication link, the communication system uses the second identifier without using a first identifier of the plurality of identifiers to authenticate the UE for a network associated with the communication system, wherein prior to establishing the second primary communication link, the communication system establishes the first primary communication link based at least in part on a first secondary communication link being established and the communication system receiving, from the UE, a request for the first primary communication link that includes the first identifier and authenticating the UE for the network associated with the communication system using the first identifier.

3. The method of claim 2, wherein each identifier of the plurality of identifiers corresponds to a different International Mobile Subscriber Identity (IMSI).

4. The method of claim 2, wherein each identifier of the plurality of identifiers is generated by the UE.

5. The method of claim 2, wherein said actively terminating the first primary communication link occurs prior to said communicating the request for the second primary communication link.

6. The method of claim 2, wherein the first and second primary communication links enable communications between the UE and other UE accessible via the network.

7. The method of claim 2, wherein the plurality of identifiers is stored in a location other than in an insertable subscriber identity module (SIM) card embedded in the UE.

8. The method of claim 2, wherein the connection policy indicates to scan the one or more frequency bands based at least in part on a determination that the first primary communication link does not satisfy the connectivity threshold.

9. The method of claim 2, wherein the network associated with the communication system is a mobile cellular network, and wherein the communication system comprises a mobile cellular network communication system that independently provides the mobile cellular network to a coverage area in which the UE is located.

10. The method of claim 2, wherein the communication system independently provides the network within a coverage area without communication to another communication system.

11. The method of claim 2, wherein the communication system comprises a mobile cellular network (MCN) communication system, wherein the first primary communication link communicatively couples the UE to the MCN communication system, and wherein the second primary communication link communicatively couples the UE to the MCN communication system.

12. The method of claim 2, wherein the communication system comprises a first mobile cellular network (MCN) communication system and a second MCN communication system, wherein the first primary communication link communicatively couples the UE to the first MCN communication system, and wherein the second primary communication link communicatively couples the UE to the second MCN communication system.

13. The method of claim 2, further comprising communicating a request for the second secondary communication link with the communication system based at least in part on a broadcast signal received from the communication system.

14. The method of claim 2, wherein the second secondary communication link is established based at least in part on a Random Access (RACH) procedure.

15. The method of claim 2, wherein the second secondary communication link enables communications between the UE and the communication system.

16. The method of claim 2, wherein the second secondary communication link does not enable communications between the UE and other UE accessible via the network.

17. A mobile communication device comprising one or more processors configured to:

after a first primary communication link is established with a communication system and based at least in part on a connection policy, actively terminate the first primary communication link and scan one or more frequency bands for broadcast signals, wherein the connection policy indicates to actively terminate the first primary communication link based at least in part on at least one of a time-based schedule, a communication-based schedule or a connectivity threshold;

based at least in part on the connection policy, select, from a plurality of identifiers stored by a user equipment (UE), a second identifier; and based at least in part on a second secondary communication link being established, communicate a request for a second primary communication link with the communication system, wherein the request for the second primary communication link includes the second identifier, and wherein to establish the second primary communication link, the communication system uses the second identifier without using a first identifier of the plurality of identifiers to authenticate the UE for a network associated with the communication system, wherein prior to establishing the second primary communication link, the communication system establishes the first primary communication link based at least in part on a first secondary communication link being established and the communication system receiving, from the UE, a request for the first primary communication link that includes the first identifier and authenticating the UE for the network associated with the communication system using the first identifier.

18. The mobile communication device of claim 17, wherein each identifier of the plurality of identifiers corresponds to a different International Mobile Subscriber Identity (IMSI).

19. The mobile communication device of claim 17, wherein the one or more processors are further configured to generate each of the plurality of identifiers.

* * * * *